United States Patent
Choi et al.

(10) Patent No.: US 11,256,262 B2
(45) Date of Patent: Feb. 22, 2022

(54) ELECTRONIC APPARATUS AND OPERATION METHOD THEREOF

(71) Applicant: LG Electronics Inc., Seoul (KR)

(72) Inventors: Sunghwan Choi, Seoul (KR); Dukyung Jung, Seoul (KR); Nayoung Yi, Seoul (KR); Chongook Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 115 days.

(21) Appl. No.: 16/731,917

(22) Filed: Dec. 31, 2019

(65) Prior Publication Data
US 2020/0133282 A1  Apr. 30, 2020

(30) Foreign Application Priority Data

Dec. 16, 2019 (KR) .......... 10-2019-0167708

(51) Int. Cl.
*G05D 1/02* (2020.01)

(52) U.S. Cl.
CPC ......... *G05D 1/0214* (2013.01); *G05D 1/0221* (2013.01); *G05D 1/0246* (2013.01)

(58) Field of Classification Search
CPC .. G05D 1/0214; G05D 1/0221; G05D 1/0246; G05D 2201/0213; G05D 1/0088; B60K 2370/167; B60K 2370/175; B60K 2370/176; B60K 2370/179; B60K 35/00; B60K 2370/191; B60K 2370/193; B60K 2370/177; B60K 2370/1529; B60W 2554/4045; B60W 2554/4048; B60W 2556/65; B60W 2050/146; B60W 60/0027; B60W 50/14; B60W 30/09; B60W 30/0956; B60W 40/02; B60W 30/14; B60W 30/08; B60W 2554/00; B60W 2552/00; G06K 9/3233; G06K 9/00637; G06K 9/00791; B60Y 2300/14; B60Y 2300/08

See application file for complete search history.

(56) References Cited

U.S. PATENT DOCUMENTS

| | | | |
|---|---|---|---|
| 8,514,099 | B2 | 8/2013 | Seder et al. |
| 9,528,838 | B2 | 12/2016 | Okumura |
| 2020/0361482 | A1* | 11/2020 | Choi .................. G01C 21/3833 |
| 2021/0157332 | A1* | 5/2021 | Cox .................. G08G 1/096791 |

* cited by examiner

Primary Examiner — Rodney A Butler
(74) Attorney, Agent, or Firm — Fish & Richardson P.C.

(57) ABSTRACT

Provided are an electronic apparatus and a method for recognizing, based on ambient road information of a vehicle and field of view information of the vehicle, a hidden region that is a region where another vehicle is possibly present in an area hidden from a field of view of the vehicle by an external object In the present disclosure, one or more of an electronic apparatus, a vehicle, a vehicular terminal, and the autonomous driving vehicle may be associated with an artificial intelligence module, an unmanned aerial vehicle (UAV), a robot, an augmented reality (AR) device, a virtual reality (VR) device, a 5G service-related device, and the like.

19 Claims, 22 Drawing Sheets

Layer X    Element regarding dangerous region

Layer C    Element regarding negotiation about driving with external vehicle
           – Driving sequence Layer B    Element regarding external vehicle
           - Position/speed of external vehicle Layer A    Element regarding vehicle
           -Driving route, stop line, detected hidden region

ELECTRONIC APPARATUS AND OPERATION METHOD THEREOF

CROSS-REFERENCE TO RELATED APPLICATION

This application claims the benefit of Korean Patent Application No. 10-2019-0167708, filed on Dec. 16, 2019, the disclosure of which is incorporated herein in its entirety by reference.

BACKGROUND

1. Field

The present disclosure relates to an electronic apparatus and an operation method thereof.

2. Description of the Related Art

Since driving stability can be affected by unexpected driving of another vehicle present beyond a field of a view of a host vehicle, there is need to secure the driving stability.

An autonomous vehicle refers to a vehicle equipped with an autonomous driving apparatus capable of recognizing environment in the surroundings of the vehicle and a state of the vehicle and accordingly controlling driving of the vehicle. Along with studies and researches on the autonomous vehicles, there are efforts to study a variety of services to improve user convenience using the autonomous vehicle.

SUMMARY

An aspects provides an electronic apparatus and an operation method thereof. Technical objects of the present disclosure are not limited thereto, and other unstated technical objects may be inferred from embodiments below.

According to an aspect, there is provided a vehicle, including a sensor configured to sense field of view information of the vehicle, and an electronic apparatus configured to acquire ambient road information of a vehicle and field of view information of the vehicle, and, based on the acquired information, recognize, as a hidden region, a region where another vehicle is possibly present in an area hidden from a field of view of the vehicle by an external object.

According to another aspect, there is also provided an electronic apparatus, including an interface configured to acquire ambient road information of a vehicle and field of view information of the vehicle, and a processor configured to, based on the acquired information, recognize, as a hidden region, a region where another vehicle is possibly present in an area hidden from a field of view of the vehicle by an external object.

According to another aspect, there is also provided a vehicle, including a sensor configured to sense field of view information of the vehicle, and an electronic apparatus configured to acquire ambient road information of a vehicle and field of view information of the vehicle and, based on the acquired information, recognize, as a hidden region, a region where another vehicle is possibly present in an area hidden from a field of view of the vehicle by an external object.

According to another aspect, there is also provided a computer-readable non-volatile recording medium for storing a program to implement the above-described method in a computer.

Details of other embodiments are included in the detailed description and the accompanied drawings.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
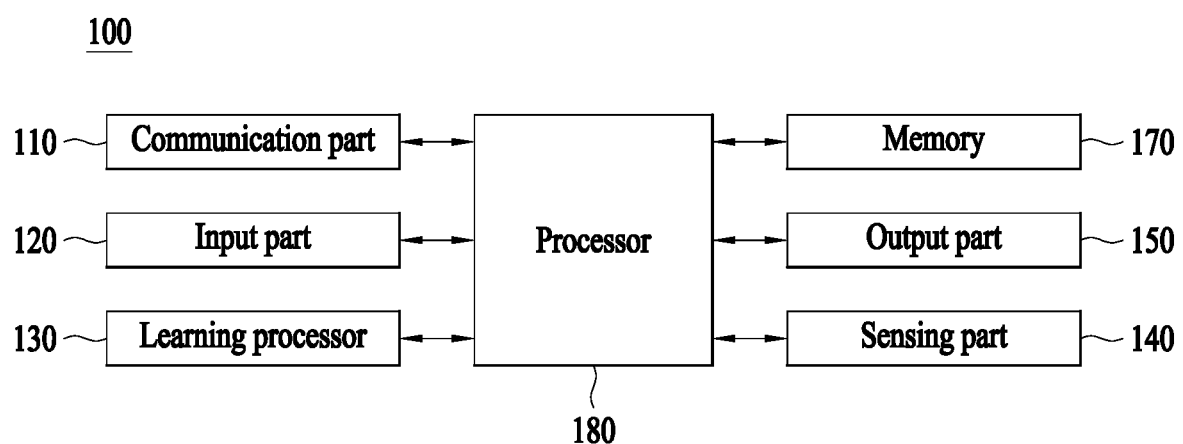
FIG. 1 illustrates an artificial intelligence (AI) device according to an example embodiment.

The terms used in the embodiments are selected, as much as possible, from general terms that are widely used at present while taking into consideration the functions obtained in accordance with the present disclosure, but these terms may be replaced by other terms based on intentions of those skilled in the art, customs, emergency of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

In addition, in this specification, "artificial Intelligence (AI)" refers to the field of studying artificial intelligence or a methodology capable of making the artificial intelligence, and "machine learning" refers to the field of studying methodologies that define and solve various problems handled in the field of artificial intelligence. The machine learning is also defined as an algorithm that enhances performance for a certain operation through a steady experience with respect to the operation.

An "artificial neural network (ANN)" may refer to a general model for use in the machine learning, which is composed of artificial neurons (nodes) forming a network by synaptic connection and has problem solving ability. The artificial neural network may be defined by a connection pattern between neurons of different layers, a learning process of updating model parameters, and an activation function of generating an output value.

The artificial neural network may include an input layer and an output layer, and may selectively include one or more hidden layers. Each layer may include one or more neurons, and the artificial neural network may include a synapse that interconnects neurons. In the artificial neural network, each neuron may output the value of an activation function concerning signals input through the synapse, weights, and deflection thereof.

The model parameters refer to parameters determined by learning, and include weights for synaptic connection and deflection of neurons, for example. Then, hyper-parameters refer to parameters to be set before learning in a machine learning algorithm, and include a learning rate, the number of repetitions, the size of a mini-batch, and an initialization function, for example.

It can be said that the purpose of learning of the artificial neural network is to determine a model parameter that minimizes a loss function. The loss function may be used as an index for determining an optimal model parameter in a learning process of the artificial neural network.

The machine learning may be classified, according to a learning method, into supervised learning, unsupervised learning, and reinforcement learning.

The supervised learning refers to a learning method for an artificial neural network in the state in which a label for learning data is given. The label may refer to a correct answer (or a result value) to be deduced by the artificial neural network when learning data is input to the artificial neural network. The unsupervised learning may refer to a learning method for the artificial neural network in the state in which no label for learning data is given. The reinforcement learning may refer to a learning method in which an agent defined in a certain environment learns to select a behavior or a behavior sequence that maximizes cumulative compensation in each state.

The machine learning realized by a deep neural network (DNN) including multiple hidden layers among artificial neural networks is also called deep learning, and the deep learning is a part of the machine learning. In the following description, the machine learning is used as a meaning including the deep learning.

In addition, in this specification, a vehicle may be an autonomous vehicle. "Autonomous driving" refers to a self-driving technology, and an "autonomous vehicle" refers to a vehicle that performs driving without a user's operation or with a user's minimum operation. In addition, the autonomous vehicle may refer to a robot having an autonomous driving function.

For example, autonomous driving may include all of a technology of maintaining the lane in which a vehicle is driving, a technology of automatically adjusting a vehicle speed such as adaptive cruise control, a technology of causing a vehicle to automatically drive in a given route, and a technology of automatically setting a route, along which a vehicle drives, when a destination is set.

Here, a vehicle may include all of a vehicle having only an internal combustion engine, a hybrid vehicle having both an internal combustion engine and an electric motor, and an electric vehicle having only an electric motor, and may be meant to include not only an automobile but also a train and a motorcycle, for example.

In the following description, embodiments of the present disclosure will be described in detail with reference to the drawings so that those skilled in the art can easily carry out the present disclosure. The present disclosure may be embodied in many different forms and is not limited to the embodiments described herein.

Hereinafter, example embodiments of the present disclosure will be described with reference to the drawings.

FIG. 1 illustrates an AI device according to an example embodiment.

The AI device 100 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, a vehicle, or an X reality (XR) device.

Referring to FIG. 1, the AI device 100 may include a communicator 110, an input part 120, a learning processor 130, a sensing part 140, an output part 150, a memory 170, and a processor 180. However, not all components shown in FIG. 1 are essential components of the AI device 100. The AI device may be implemented by more components than those illustrated in FIG. 1, or the AI device may be implemented by fewer components than those illustrated in FIG. 1.

The communicator 110 may transmit and receive data to and from external devices, such as other AI devices 100a to 100e and an AI server 200, using wired/wireless communication technologies. For example, the communicator 110 may transmit and receive sensor information, user input, learning models, and control signals, for example, to and from external devices.

At this time, the communication technology used by the communicator 110 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

The input part 120 may acquire various types of data.

At this time, the input part 120 may include a camera for the input of an image signal, a microphone for receiving an audio signal, and a user input part for receiving information input by a user, for example. Here, the camera or the microphone may be handled as a sensor, and a signal acquired from the camera or the microphone may be referred to as sensing data or sensor information.

The input part 120 may acquire, for example, input data to be used when acquiring an output using learning data for model learning and a learning model. The input part 120 may acquire unprocessed input data, and in this case, the processor 180 or the learning processor 130 may extract an input feature as pre-processing for the input data.

The learning processor 130 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

At this time, the learning processor 130 may perform AI processing along with a learning processor 240 of the AI server 200.

At this time, the learning processor 130 may include a memory integrated or embodied in the AI device 100. Alternatively, the learning processor 130 may be realized using the memory 170, an external memory directly coupled to the AI device 100, or a memory held in an external device.

The sensing part 140 may acquire at least one of internal information of the AI device 100, environmental information around the AI device 100, and user information using various sensors.

At this time, the sensors included in the sensing part 140 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, a radar, and a temperature sensor, for example.

The output part 150 may generate, for example, a visual output, an auditory output, or a tactile output.

At this time, the output part 150 may include, for example, a display that outputs visual information, a speaker that outputs auditory information, and a haptic module that outputs tactile information.

The memory 170 may store data which assists various functions of the AI device 100. For example, the memory 170 may store input data acquired by the input part 120, learning data, learning models, and learning history, for example. The memory 170 may include a storage medium of at least one type among a flash memory, a hard disk, a multimedia card micro type memory, a card type memory (e.g., SD or XD memory), a random access memory (RAM) a static random access memory (SRAM), a read only memory (ROM), an electrically erasable programmable read-only memory (EEPROM), a programmable read-only memory (PROM), a magnetic memory, a magnetic disc, and an optical disc.

The processor 180 may determine at least one executable operation of the AI device 100 based on information determined or generated using a data analysis algorithm or a machine learning algorithm. Then, the processor 180 may control constituent elements of the AI device 100 to perform the determined operation.

To this end, the processor 180 may request, search, receive, or utilize data of the learning processor 130 or the memory 170, and may control the constituent elements of the AI device 100 so as to execute a predictable operation or an operation that is deemed desirable among the at least one executable operation.

At this time, when connection of an external device is required to perform the determined operation, the processor 180 may generate a control signal for controlling the external device and may transmit the generated control signal to the external device.

The processor 180 may acquire intention information with respect to user input and may determine a user request based on the acquired intention information.

At this time, the processor 180 may acquire intention information corresponding to the user input using at least one of a speech to text (STT) engine for converting voice input into a character string and a natural language processing (NLP) engine for acquiring natural language intention information.

At this time, at least a part of the STT engine and/or the NLP engine may be configured with an artificial neural network learned according to a machine learning algorithm. Then, the STT engine and/or the NLP engine may have learned by the learning processor 130, may have learned by a learning processor 240 of the AI server 200, or may have learned by distributed processing of these processors.

The processor 180 may collect history information including, for example, the content of an operation of the AI device 100 or feedback of the user with respect to an operation, and may store the collected information in the memory 170 or the learning processor 130, or may transmit the collected information to an external device such as the AI server 200. The collected history information may be used to update a learning model.

The processor 180 may control at least some of the constituent elements of the AI device 100 in order to drive an application program stored in the memory 170. Moreover, the processor 180 may combine and operate two or more of the constituent elements of the AI device 100 for the driving of the application program.

Figure 2:
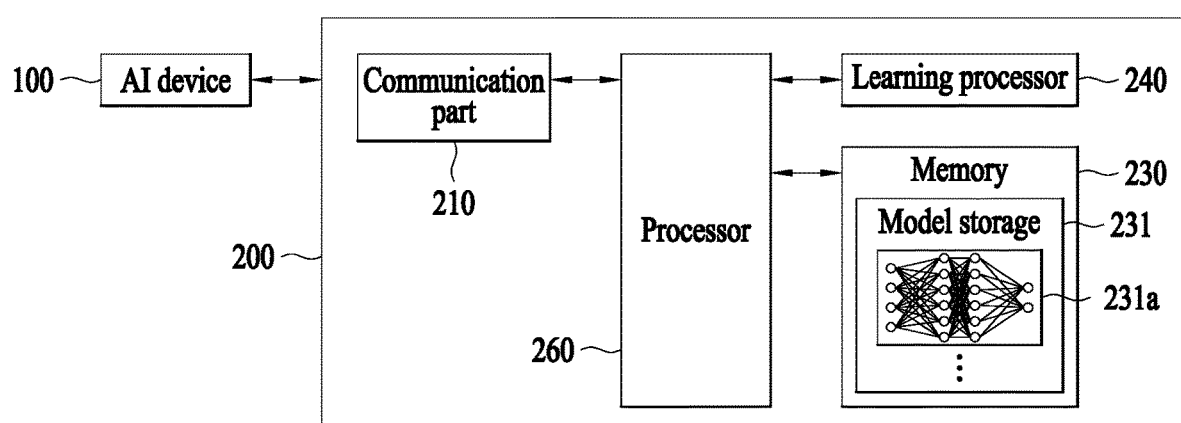
FIG. 2 illustrates an AI server according to an example embodiment.

FIG. 2 illustrates an AI server according to an example embodiment.

Referring to FIG. 2, an AI server 200 may refer to a device that causes an artificial neural network to learn using a machine learning algorithm or uses the learned artificial neural network. Here, the AI server 200 may be constituted of multiple servers to perform distributed processing, and may be defined as a 5G network. At this time, the AI server 200 may be included as a constituent element of the AI device 100 so as to perform at least a part of AI processing together with the AI device.

The AI server 200 may include a communicator 210, a memory 230, a learning processor 240, and a processor 260.

The communicator 210 may transmit and receive data to and from an external device such as the AI device 100.

The memory 230 may include a model storage 231. The model storage 231 may store a model (or an artificial neural network 231*a*) which is learning or has learned via the learning processor 240.

The learning processor 240 may cause the artificial neural network 231*a* to learn learning data. A learning model may be used in the state of being mounted in the AI server 200 of the artificial neural network, or may be used in the state of being mounted in an external device such as the AI device 100.

The learning model may be realized in hardware, software, or a combination of hardware and software. In the case in which a part or the entirety of the learning model is realized in software, one or more instructions constituting the learning model may be stored in the memory 230.

The processor 260 may deduce a result value for newly input data using the learning model, and may generate a response or a control instruction based on the deduced result value.

Figure 3:
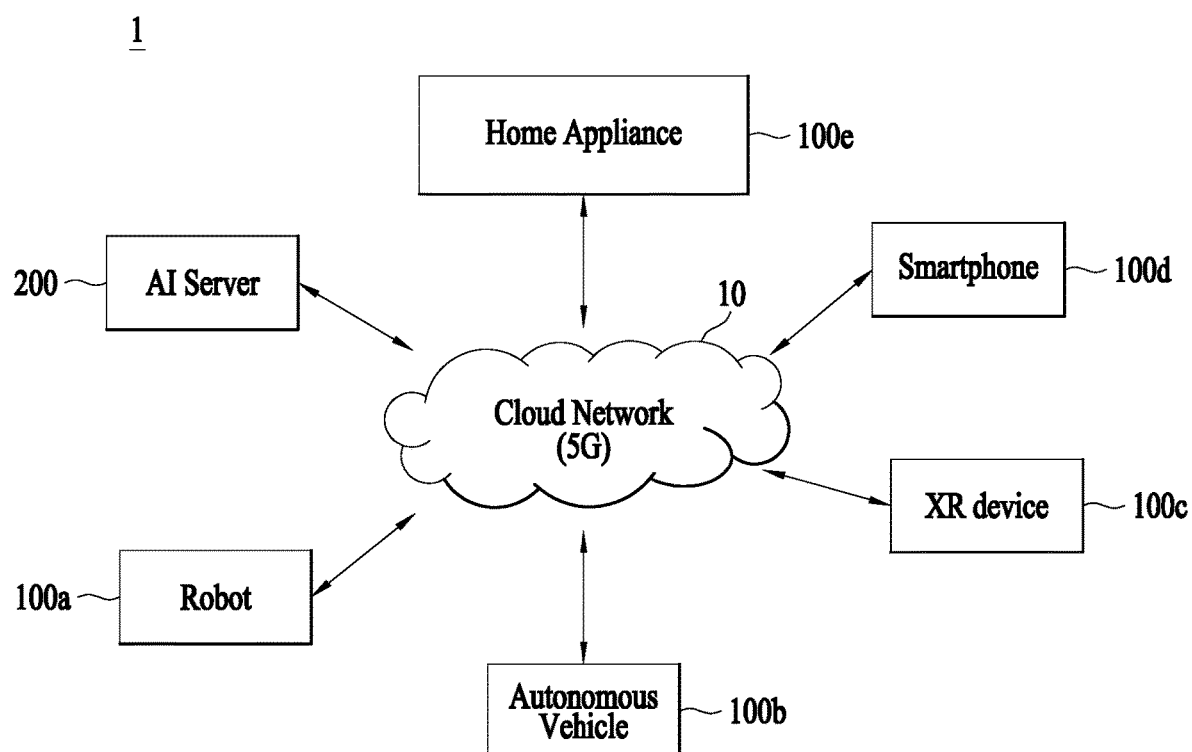
FIG. 3 illustrates an AI system according to an example embodiment.

FIG. 3 illustrates an AI system according to an example embodiment.

Referring to FIG. 3, in the AI system 1, at least one of the AI server 200, a robot 100*a*, an autonomous vehicle 100*b*, an XR device 100*c*, a smart phone 100*d*, and a home appliance 100*e* is connected to a cloud network 10. Here, the robot 100*a*, the autonomous vehicle 100*b*, the XR device 100*c*, the smart phone 100*d*, and the home appliance 100*e*, to which AI technologies are applied, may be referred to as AI devices 100*a* to 100*e*.

The cloud network 10 may constitute a part of a cloud computing infra-structure, or may refer to a network present in the cloud computing infra-structure. Here, the cloud network 10 may be configured using a 3G network, a 4G or long term evolution (LTE) network, or a 5G network, for example.

That is, respective devices 100*a* to 100*e* and 200 constituting the AI system 1 may be connected to each other via the cloud network 10. In particular, respective devices 100*a* to 100*e* and 200 may communicate with each other via a base station, or may perform direct communication without the base station.

The AI server 200 may include a server which performs AI processing and a server which performs an operation with respect to big data.

The AI server 200 may be connected to at least one of the robot 100*a*, the autonomous vehicle 100*b*, the XR device 100*c*, the smart phone 100*d*, and the home appliance 100*e*, which are AI devices constituting the AI system 1, via cloud network 10, and may assist at least a part of AI processing of connected the AI devices 100*a* to 100*e*.

At this time, instead of the AI devices 100*a* to 100*e*, the AI server 200 may cause an artificial neural network to learn according to a machine learning algorithm, and may directly store a learning model or may transmit the learning model to the AI devices 100*a* to 100*e*.

At this time, the AI server 200 may receive input data from the AI devices 100*a* to 100*e*, may deduce a result value for the received input data using the learning model, and may generate a response or a control instruction based on the deduced result value to transmit the response or the control instruction to the AI devices 100*a* to 100*e*.

Alternatively, the AI devices 100*a* to 100*e* may directly deduce a result value with respect to input data using the learning model, and may generate a response or a control instruction based on the deduced result value.

Hereinafter, various example embodiments of the AI devices 100*a* to 100*e*, to which the above-described technology is applied, will be described. Here, the AI devices 100*a* to 100*e* illustrated in FIG. 3 may be specific example embodiments of the AI device 100 illustrated in FIG. 1.

The autonomous vehicle 100*b* may be realized into a mobile robot, a vehicle, or an unmanned air vehicle, for example, through the application of AI technologies.

The autonomous vehicle 100*b* may include an autonomous driving control module for controlling an autonomous driving function, and the autonomous driving control module may mean a software module or a chip realized in hardware. The autonomous driving control module may be a constituent element included in the autonomous vehicle 1200*b*, but may be a separate hardware element outside the autonomous vehicle 1200*b* so as to be connected thereto.

The autonomous vehicle 100*b* may acquire information on the state of the autonomous vehicle 1200*b* using sensor information acquired from various types of sensors, may detect or recognize the surrounding environment and an object, may generate map data, may determine a movement route and a driving plan, or may determine an operation.

Here, the autonomous vehicle 100*b* may use sensor information acquired from at least one sensor among a lidar, a radar, and a camera in the same manner as the robot 1200*a* in order to determine a movement route and a driving plan.

In particular, the autonomous vehicle 100*b* may recognize the environment or an object with respect to an area outside the field of vision or an area located at a predetermined distance or more by receiving sensor information from external devices, or may directly receive recognized information from external devices.

The autonomous vehicle 100*b* may perform the above-described operations using a learning model configured with at least one artificial neural network. For example, the autonomous vehicle 100*b* may recognize the surrounding environment and the object using the learning model, and may determine a driving line using the recognized surrounding environment information or object information. Here, the learning model may be directly learned in the autonomous vehicle 100*b*, or may be learned in an external device such as the AI server 200.

At this time, the autonomous vehicle 100*b* may generate a result using the learning model to perform an operation, but may transmit sensor information to an external device such as the AI server 200 and receive a result generated by the external device to perform an operation.

The autonomous vehicle 100*b* may determine a movement route and a driving plan using at least one of map data, object information detected from sensor information, and object information acquired from an external device, and a drive part may be controlled to drive the autonomous vehicle 100*b* according to the determined movement route and driving plan.

The map data may include object identification information for various objects arranged in a space (e.g., a road) along which the autonomous vehicle 100*b* drives. For example, the map data may include object identification information for stationary objects, such as streetlights, rocks, and buildings, and movable objects such as vehicles and pedestrians. Then, the object identification information may include names, types, distances, and locations, for example.

In addition, the autonomous vehicle 100*b* may perform an operation or may drive by controlling the drive part based on user control or interaction. At this time, the autonomous vehicle 100*b* may acquire interactional intention information depending on a user operation or voice expression, and may determine a response based on the acquired intention information to perform an operation.

Figure 4:
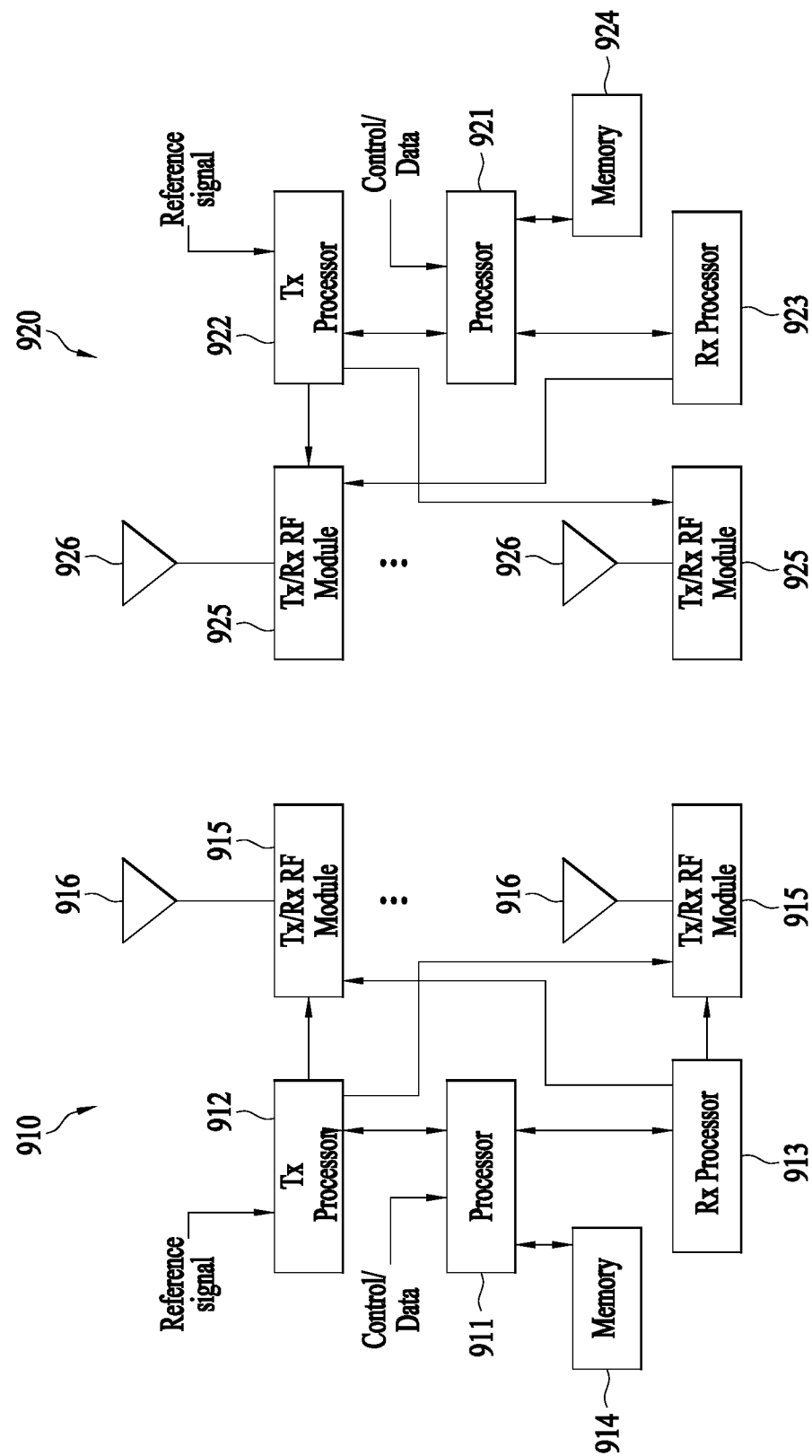
FIG. 4 is a block diagram illustrating a wireless communication system to which the methods proposed in the present disclosure are applicable.

FIG. 4 is a block diagram illustrating a wireless communication system to which the methods proposed in the present disclosure are applicable.

Referring to FIG. 4, a device including an autonomous vehicle, hereinafter also referred to as "autonomous driving device", may be defined as a first communication device as indicated by a reference numeral 910. A processor 911 may perform a detailed operation for autonomous driving.

A 5G network including another vehicle that communicates with the autonomous driving device may be defined as a second communication device, as indicated by a reference numeral 920. A processor 921 may perform a detailed operation for autonomous driving.

The 5G network may also be referred to as the first communication device and the autonomous driving device may also be referred to as the second communication device.

The first communication device or the second communication device may be, for example, a base station, a network node, a transmitting terminal, a receiving terminal, a wireless device, a wireless communication device, and an autonomous driving device.

A terminal or user equipment (UE) may include, for example, a vehicle, a mobile phone, a smartphone, a laptop computer, a digital broadcast terminals, a personal digital assistant (PDA), a portable multimedia player (PMP), a navigator, a slate PC, a tablet PC, an ultrabook, and a wearable device such as a smartwatch, a smart glass, and a head mounted display (HIVID), and the like. For example, the HIVID may be a display device to be worn on a head. For example, the HIVID may be used to implement a virtual reality (VR), an augmented reality (AR), or a mixed reality (MR). Referring to FIG. 4, the first communication device 910 and the second communication device 920 may include the processors 911 and 921, the memory 914 and 924, one or more Tx/Rx radio frequency (RF) modules 915 and 925, Tx processors 912 and 922, Rx processors 913 and 923, and antennas 916 and 926. The Tx/Rx module may also be referred to as a transceiver. Each of the Tx/Rx RF modules 915 and 925 may transmit a signal using the antennas 916 and 926. The processor may implement the functions, processes, and/or methods described herein. The processor 921 may be associated with the memory 924 that stores a program code and data. The memory may also be referred to as a computer-readable medium. Specifically, in downlink (DL) communication, for example, communication from the first communication device to the second communication device, the Tx processor 912 may implement various signal processing functions for a layer L1, that is, a physical layer. The Rx processor may implement various signal processing functions of the layer L1, that is, a physical layer.

Uplink (UL) communication, for example, communication from the second communication device to the first communication device may be processed in the first communication device 910 in a manner similar to that described with respect to the function of the receiver in the second communication device 920. Each of the Tx/Rx modules 925 may receive a signal using the antenna 926. Each of the Tx/Rx modules may provide a radio frequency (RF) carrier wave and information to the Rx processor 923. The processor 921 may be associated with the memory 924 that stores a program code and data. The memory may also be referred to as a computer-readable medium.

Figure 5:
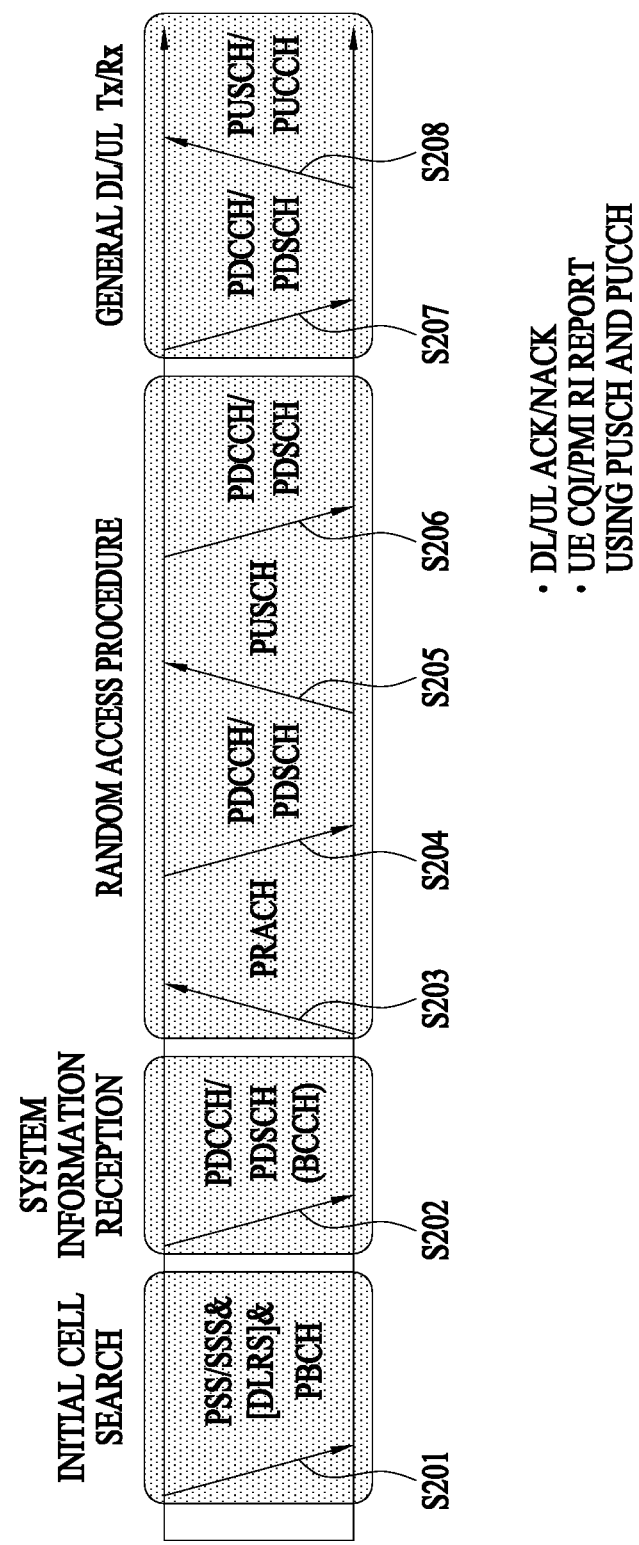
FIG. 5 is a diagram illustrating an example of a signal transmission and reception method performed in a wireless communication system.

FIG. 5 illustrates an example of a signal transmission and reception method performed in a wireless communication system.

Referring to FIG. 5, in operation S201, when UE is powered on or enters a new cell, the UE performs an initial cell search procedure such as acquisition of synchronization with a BS. To this end, the UE may adjust synchronization with the BS by receiving a primary synchronization channel (P-SCH) and a secondary synchronization channel (S-SCH) from the BS and acquire information such as a cell identifier (ID). In an LTE system and a new radio (NR) system, the P-SCH and the S-SCH may also be referred to as a primary synchronization signal (PSS) and a secondary synchronization signal (SSS), respectively. After the initial cell search, the UE may acquire in-cell broadcast information by receiving a physical broadcast channel from the BS. In the initial cell search procedure, the UE may monitor a DL channel state by receiving a downlink reference signal (DL RS). When the initial cell search procedure is terminated, in operation S202, the UE may acquire more detailed system information by receiving a physical downlink control channel (PDCCH) and a physical downlink shared channel (PDSCH) based on information carried on the PDCCH.

Meanwhile, if the UE initially accesses the BS or if radio resources for signal transmission are absent, the UE may perform a random access procedure with respect to the BS in operations S203 through S206. To this end, the UE may transmit a specific sequence as a preamble through a physical random access channel (PRACH) in operations S203 and S205 and receive a random access response (RAR) message for the preamble through the PDCCH and the PDSCH corresponding to the PDCCH in operations S204 and S206. In the case of a contention-based RACH, the UE may additionally perform a contention resolution procedure.

After performing the above procedures, the UE may perform PDCCH/PDSCH reception in operation S207 and perform physical uplink shared channel (PUSCH)/physical uplink control channel (PUCCH) transmission in operation S208, as a general UL/DL signal transmission procedure. For example, the UE may receive downlink control information (DCI) through the PDCCH. The UE may monitor a set of PDCCH candidates in monitoring occasions set in one or more control element sets (CORESETs) on a serving cell based on corresponding search space configurations. The set of PDCCH candidates to be monitored by the UE may be defined in terms of search space sets. The search space set may be a common search space set or a UE-specific search space set. The CORESET may include a set of (physical) resource blocks having a time duration of one to three orthogonal frequency division multiplexing (OFDM) symbols. A network may set the UE to have a plurality of CORESETs. The UE may monitor PDCCH candidates in one or more search space sets. Here, the monitoring may indicate attempting to decode the PDCCH candidate(s) in the search space. When the UE succeeds in decoding one of the PDCCH candidates in the search space, the UE may determine that the PDCCH is detected in the corresponding PDCCH candidate and perform PDSCH reception or PUSCH transmission based on the DCI in the detected PDCCH. The PDCCH may be used to schedule DL transmission on the PDSCH and UL transmission on the PUSCH. Here, the DCI on the PDCCH may include downlink assignment, that is, a downlink grant (DL grant) including at least a modulation and coding format and resource allocation information in association with a downlink shared channel, or an uplink grant (UL grant) including a modulation and coding formal and resource allocation information in association with an uplink shared channel.

An initial access (IA) procedure performed in a 5G communication system will be further described with reference to FIG. 5.

UE may perform cell search, system information acquisition, beam alignment for initial access, DL measurement, and the like based on a synchronization signal block (SSB). The term "SSB" may be interchangeably used with the term "synchronization signal/physical broadcast channel (SS/PBCH) block".

The SSB may include a PSS, an SSS, and a PBCH. The SSB may include four consecutive OFDM symbols. For each of the OFDM symbols, the PSS, the PBCH, the SSS/PBCH, or the PBCH may be transmitted. The PSS and the SSS may each include one OFDM symbols and 127 subcarriers. The PBCH may include three OFDM symbols and 576 subcarriers.

The cell search may indicate a process in which the UE acquires time/frequency synchronization of a cell and detect a cell ID, for example, a physical layer cell ID (PCI) of the cell. The PSS may be used to detect a cell ID in a cell ID group. The SSS may be used to detect the cell ID group. The PBCH may be used for SSB (time) index detection and half-frame detection.

336 cell ID groups may be present. Three cell IDs may belong to each of the cell ID groups. Information on a cell ID group to which a cell ID of a cell belongs may be provided/acquired through an SSS of the cell. Information on the cell ID among 336 cells in the cell ID may be provided/acquired through the PSS.

The SSB may be periodically transmitted based on an SSB periodicity. When performing the initial cell search, a basic SSB periodicity assumed by the UE may be defined as 20 ms. After the cell connection, the SSB periodicity may be set to one of 5 ms, 10 ms, 20 ms, 40 ms, 80 ms, and 160 ms by a network, for example, the BS.

Acquisition of system information (SI) will be described as follows.

The SI may be divided into a master information block (MIB) and a plurality of system information blocks (SIBs). The SI other than the MIB may be referred to as remaining minimum system information (RMSI). The MIB may include information/parameter for monitoring the PDCCH that schedules the PDSCH carrying SystemInformation-Block1 (SIB1), and may be transmitted by the BS through the PBCH of the SSB. The SIB1 may include information associated with availabilities and scheduling (e.g., a transmission period and an SI-window size) of remaining SIBs (hereinafter, referred to as "SIBx", x being an integer greater than or equal to 2). The SIBx may be included in an SI message and transmitted through the PDSCH. Each SI message may be transmitted within a time window, that is, an SI-window occurring periodically.

A random access (RA) procedure performed in the 5G communication system will be further described with reference to FIG. 5.

The RA procedure may be used for various purposes. For example, the RA procedure may be used for network initial access, handover, and UE-triggered UL data transmission. The UE may acquire UL synchronization and UL transmission resources through the RA procedure. The RA procedure may include a contention-based RA procedure and a contention-free RA procedure. A detailed process of the contention-based RA procedure is described as follows.

The UE may transmit an RA preamble through the PRACH as Msg1 of the RA procedure in the UL communication. RA preamble sequences having two different lengths may be supported. A large sequence length of 839 may be applied to subcarrier spacing of 1.25 and 5 kilohertz (kHz). A small sequence length of 139 may be applied to subcarrier spacing of 15 kHz, 30 kHz, 60 kHz, and 120 kHz.

When the BS receives the RA preamble from the UE, the BS may transmit a random access response (RAR) message Msg2 to the UE. The PDCCH that schedules the PDSCH carrying the RAR may cyclic redundancy check (CRC)-masked with an RA radio network temporary identifier (RA-RNTI), and then transmitted. The UE may detect the PDCCH masked with the RA-RNTI and receive the RAR from the PDSCH scheduled by the DCI carried by the PDCCH. The UE may verify whether a preamble transmitted by the UE, that is, RAR information for the Msg1 is present in the RAR. Whether RA information for the Msg1 transmitted by the UE is present may be determined based on whether an RA preamble ID for the preamble transmitted by the UE is present. When a response to the Msg1 is absent, the UE may retransmit an RACH preamble within a predetermined number of times while performing power ramping. The UE may calculate PRACH transmitting power for retransmitting a preamble based on a most recent path loss and a power ramping counter.

The UE may perform the UL transmission on the uplink shared channel based on the RAR information as transmission of Msg3 in the random access procedure. The Msg3 may include an RRC connection request and a UE identifier. As a response to the Msg3, the network may transmit Msg4, which may treated as a contention resolution message on the DL. By receiving the Msg4, the UE may enter an RRC-connected state.

Ultra-reliable and low latency communication (URLLC) transmission defined in the NR may be transmission associated with: (1) a relatively low traffic amount; (2) a relatively low arrival rate; (3) an ultra-low latency requirement (e.g., 0.5 and 1 ms); (4) a relatively short transmission duration (e.g., 2 OFDM symbols); and (5) an urgent service/message. In the case of the UL, to satisfy a more stringent latency requirement, transmission of a specific type of traffic, for example, URLLC may be multiplexed with another transmission scheduled in advance, for example, enhanced Mobile Broadband communication (eMBB). As one method related thereto, information indicating that preemption is to be performed on predetermined resources is transmitted to the UE scheduled in advance, so that URLLC UE uses the corresponding resources for UL transmission.

In a case of the NR, dynamic resource sharing between the eMBB and the URLLC may be supported. eMBB and URLLC services may be scheduled on non-overlapping time/frequency resources. The URLLC transmission may occur on resources scheduled with respect to ongoing eMBB traffic. eMBB UE may not know whether PDSCH transmission of the corresponding UE is partially punctured. Also, due to corrupted coded bits, the UE may not decode the PDSCH. Considering this, a preemption indication may be provided in the NR. The preemption indication may also be referred to as an interrupted transmission indication.

In association with the preemption indication, the UE may receive DownlinkPreemption IE through RRC signaling from the BS. When the UE receives the DownlinkPreemption IE, the UE may be configured with an INT-RNTI provided by a parameter int-RNTI in the DownlinkPreemption IE for monitoring of the PDCCH conveying a DCI format 2_1. The UE may be additionally configured to have a set of serving cells by INT-ConfigurationPerServing Cell including a set of serving cell indices provided by serving-CellID and a corresponding set of positions for fields in the DCI format 2_1 by positionInDCI, configured to have information payload size for the DCI format 2_1 by dci-PayloadSize, and configured to have an indication granularity of time-frequency resources by timeFrequencySect.

The UE may receive the DCI format 2_1 from the BS based on the DownlinkPreemption IE.

When the UE detects the DCI format 2_1 for a serving cell in a set of serving cells, the UE may assume that no transmission to the UE is performed in symbols and PRBs indicated by the DCI format 2_1 among a set of symbols and a set of PRBs corresponding to the last monitoring period of a monitoring period to which the DCI format 2_1 belongs. For example, the UE may determine that a signal in the time-frequency resources indicated by the preemption is not the DL transmission scheduled for the UE and thus, decode data based on signals received in remaining resource areas.

Figure 6:
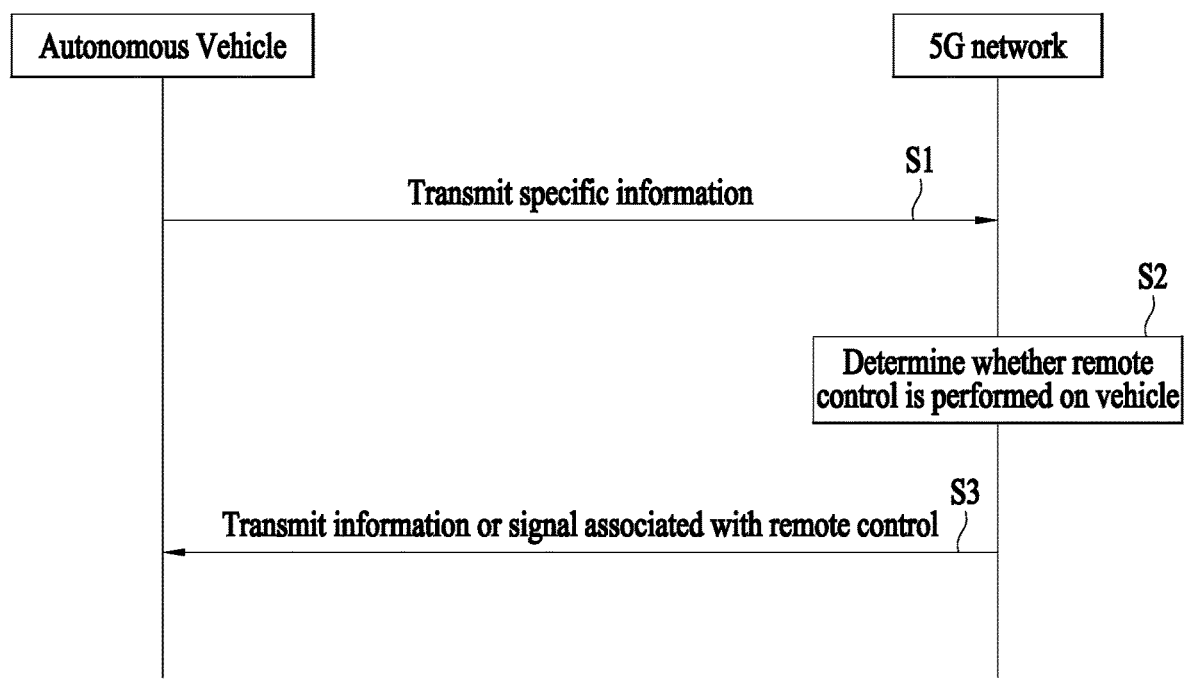
FIG. 6 illustrates an example of basic operations of an autonomous vehicle and a 5G network in a 5G communication system.

FIG. 6 illustrates an example of basic operations of an autonomous vehicle and a 5G network in a 5G communication system.

In operation S1, the autonomous vehicle may transmit specific information to a 5G network. The specific information may include autonomous driving-related information. In operation S2, the 5G network may determine whether a remote control is performed on the vehicle. Here, the 5G network may include a server or a module for performing an autonomous driving-related remote control. In operation S3, the 5G network may transmit information or a signal associated with the remote control to the autonomous vehicle.

Hereinafter, an operation of the autonomous vehicle using 5G communication will be described in detail with reference to FIGS. 11 and 12 and the aforementioned wireless communication technologies such as a beam management (BM) procedure, URLLC, massive Machine Type Communication (mMTC), and the like.

A basic procedure of an application operation to which the method proposed in the present disclosure and eMBB technology of the 5G communication are applicable will be described.

Likewise operations S1 and S3 of FIG. 6, to transmit and receive a signal, information, and the like to and from the 5G network, the autonomous vehicle may perform an initial access procedure and a random access procedure in connection with the 5G network before operation S1 of FIG. 6 is performed.

Specifically, the autonomous vehicle may perform the initial access procedure in connection with the 5G network based on an SSB to acquire a DL synchronization and system information. In the initial access procedure, a BM process and a beam failure recovery process may be added. Also, a quasi-co location (QCL) relationship may be added in a process of receiving a signal from the 5G network by the autonomous vehicle.

The autonomous vehicle may perform the random access procedure in connection with the 5G network for acquisition of a UL synchronization and/or UL transmission. The 5G network may transmit a UL grant for scheduling transmission of specific information to the autonomous vehicle. The autonomous vehicle may transmit the specific information to the 5G network based on the UL grant. In addition, the 5G network may transmit a DL grant for scheduling transmission of a result of 5G processing for the specific information to the autonomous vehicle. The 5G network may transmit information or a signal associated with the remote control to the autonomous vehicle based on the DL grant.

A basic procedure of an application operation to which URLLC technology of the 5G communication and the method proposed in the present disclosure are applicable will be described as follows.

As described above, the autonomous vehicle may perform the initial access procedure and/or the random access procedure in connection with the 5G network, and then receive DownlinkPreemption IE from the 5G network. The autonomous vehicle may receive DownlinkPreemption IE a DCI format 2_1 including a preemption indication from the 5G network. The autonomous vehicle may not perform, expect, or assume reception of eMBB data on resources, for example, a PRB and/or an OFDM symbol indicated by the preemption indication. Thereafter, when specific information is to be transmitted, the autonomous vehicle may receive the UL grant from the 5G network.

A basic procedure of an application operation to which mMTC technology of the 5G communication and the method proposed in the present disclosure are applicable will be described as follows.

Among operations of FIG. 6, a part changed according to the application of the mMTC technology will be mainly described.

Referring to FIG. 6, in operation S1, the autonomous vehicle may receive a UL grant from the 5G network to transmit specific information to the 5G network. Here, the UL grant may include information on a number of repetitions for transmission of the specific information. The specific information may be repetitively transmitted based on the information on the number of repetitions. That is, the autonomous vehicle may transmit the specific information to the 5G network based on the UL grant. The repetitive transmission of the specific information may be performed through frequency hopping. For example, first transmission of the specific information may be performed on a first frequency resource and second transmission of the specific information may be performed on a second frequency resource. The specific information may be transmitted through a narrowband of a resource block 1RB or a resource block 6RB.

Figure 7:
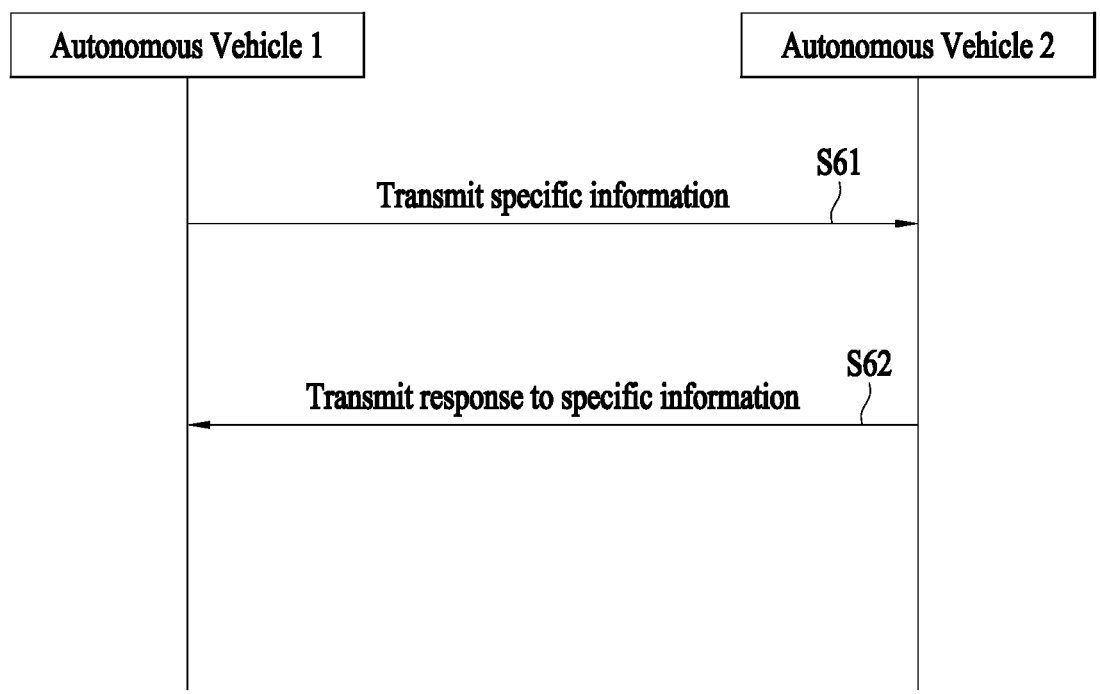
FIG. 7 illustrates an example of basic operations between a vehicle and another vehicle using 5G communication.

FIG. 7 illustrates an example of basic operations performed between a vehicle and another vehicle using 5G communication.

In operation S61, a first vehicle may transmit specific information to a second vehicle. In operation S62, the second vehicle may transmit a response to the specific information to the first vehicle.

A configuration of application operations between a vehicle and another vehicle may vary based on whether the 5G network is involved directly (sidelink communication transmitting mode 3) or indirectly (sidelink communication transmitting mode 4) with the specific information and resource allocation of a response to the specific information.

Application operations performed between a vehicle and another vehicle using the 5G communication will be described as follows.

First, how the 5G network is directly involved in resource allocation of signal transmission/reception between vehicles will be described.

The 5G network may transmit a DCI format 5A for scheduling of mode-3 transmission (PSCCH and/or PSSCH transmission) to the first vehicle. Here, a physical sidelink control channel (PSCCH) may be a 5G physical channel for scheduling transmission of specific information. Also, a physical sidelink shared channel (PSSCH) may be a 5G physical channel for transmitting the specific information. The first vehicle may transmit an SCI format 1 for scheduling transmission of specific information to the second vehicle on the PSCCH. Also, the first vehicle may transmit the specific information to the second vehicle on the PSSCH.

Next, how the 5G network is indirectly involved in resource allocation of signal transmission/reception between vehicles will be described.

The first vehicle may sense a resource for the mode-4 transmission in a first window. The first vehicle may select a resource for the mode-4 transmission in a second window based on a result of the sensing. Here, the first window may be a sensing window and the second window may be a selection window. The first vehicle may transmit the SCI format 1 for scheduling transmission of specific information to the second vehicle on the PSCCH based on the selected resource. Also, the first vehicle may transmit the specific information to the second vehicle on the PSSCH.

The autonomous vehicle performing at least one of V2V communication and V2X communication may transmit and receive information on a channel of the corresponding communication. For example, for the V2V communication and the V2X communication, channels for sidelinks corresponding to the communication methods may be allocated, so that the autonomous vehicle transmits and receives information on the corresponding channel to and from a server or another vehicle. Also, a shared channel for a sidelink may be allocated, so that a signal for at least one of the V2V communication and the V2X communication is transmitted and received on the corresponding channel. In order to perform at least one of the V2V communication and the V2X communication, the autonomous vehicle may acquire a separate identifier of the corresponding communication from at least one of a base station, a network, and another vehicle. The autonomous vehicle may perform the V2V communication and the V2X communication based on information on the acquired separate identifier.

Information transmitted through broadcasting may be transmitted on a separate channel for broadcasting. Node-to-node communication may be performed on a channel different from the channel for broadcasting. Also, information for controlling the autonomous vehicle may be transmitted on a channel for URLLC.

An electronic apparatus according to the present disclosure may include an interface configured to acquire ambient road information of a vehicle and field of view information of the vehicle, and a processor configured to recognize, based on the acquired information, a hidden region that is a region where another vehicle is possibly present in an area hidden from a field of view of the vehicle by an external object.

A processor may recognize a position and a size of the external object based on the acquired information, and recognize the hidden region based on the position and the size of the external object.

The ambient road information may include information regarding a lane adjacent to a lane in which the external object is present. The processor may determine whether there is at least one lane in an area hidden from the field of view of the vehicle by the external object.

The processor may determine whether it is possible to acquire information on presence of any external vehicle in the hidden region. Based on a result of the determination, the processor may recognize a danger region that is nearby the hidden region in a driving scheduled route of the vehicle.

The processor may provide information regarding the dangerous region through an output part provided in the vehicle.

When it is not possible to acquire the information on presence of any external vehicle in the hidden region, the processor may recognize the dangerous region that is nearby the hidden region in the driving scheduled route of the vehicle.

The processor may determine whether any external vehicle is present in the hidden region. When any external vehicle is present in the hidden region, the processor may determine whether it is possible to acquire information on a driving scheduled route of a corresponding external vehicle. When it is not possible to acquire the information on the driving scheduled route of the external vehicle, the processor may recognize a region nearby the hidden region in the driving scheduled route of the vehicle as a dangerous region.

The processor may recognize the dangerous region, which is nearby the hidden region in the driving scheduled route of the vehicle, may determine a level of danger of the dangerous region, and may control the vehicle according to the level of danger.

The processor may control driving of the vehicle by setting a first standby position and a second standby position on the driving scheduled route of the vehicle. The first standby position may be a position from which an external vehicle enters from the hidden region into the field of view of the vehicle, and the second standby position may be a position from which the vehicle enters into the field of view of the external vehicle.

Through a display provided in the vehicle, the processor may display at least one of: information regarding the hidden region, information regarding the external vehicle in the hidden region, information on the driving scheduled route of the vehicle, or information on the driving scheduled route of the external vehicle. The display may be a Head Up Display (HUD) to provide an augmented reality.

A vehicle according to the present disclosure may include a sensor configured to sense field of view information of the vehicle, and an electronic apparatus configured to acquire ambient road information of the vehicle and field of view information of the vehicle and recognize, based on the acquired information, a hidden region that is a region where another vehicle is possibly present in an area hidden from the field of view of the vehicle by an external object. The sensor may include at least one of a radar sensor, a lidar sensor, or an image sensor such as a camera.

The electronic apparatus may recognize a position and a size of an external object based on the acquired information, and recognize the hidden region based on the position and the size of the external object.

The ambient road information may include information regarding a lane adjacent to a lane in which the external object is present. Based on the information regarding the adjacent lane, the electronic apparatus may determine whether there at least one lane is present in a region hidden from the field of view of the vehicle by the external object.

The electronic apparatus may determine whether it is possible to acquire information on presence of an external vehicle in the hidden region. Based on a result of the determination, the electronic apparatus may recognize a dangerous region that is nearby the hidden region in a driving scheduled route of the vehicle.

The vehicle may further include an output part, and thus, the electronic apparatus may provide the information regarding the dangerous region through the output part. The output part may include at least one of an image output part and an audio output part.

When it is not possible to acquire information on presence of any external vehicle in the hidden region, the electronic apparatus may recognize a dangerous region that is nearby the hidden region in the driving scheduled route of the vehicle.

The electronic apparatus may determine whether any external vehicle is present in the hidden region. When any external vehicle is present in the hidden region, the electronic apparatus may determine whether it is possible to acquire information on a driving scheduled route of a corresponding external vehicle. When it is not possible to acquire the information on the driving scheduled route of the external vehicle, the electronic apparatus may recognize a region nearby the hidden region in the driving scheduled route of the vehicle as a dangerous region.

The electronic apparatus may recognize the dangerous region, which is nearby the hidden region in the driving scheduled route of the vehicle, may determine a level of danger of the dangerous region, and may control the vehicle according to the level of danger.

The electronic apparatus may control driving of the vehicle by setting a first standby position and a second standby position on the driving scheduled route of the vehicle. The first standby position may be a position from which an external vehicle enters from the hidden region into the field of view of the vehicle, and the second standby position may be a position from which the vehicle enters into the field of view of the external vehicle.

Through a display provided in the vehicle, the electronic apparatus may display at least one of: information regarding the hidden region, information regarding the external vehicle in the hidden region, information on the driving scheduled route of the vehicle, or information on the driving scheduled route of the external vehicle. The display may be a Head Up Display (HUD) to provide an augmented reality.

Figure 8:
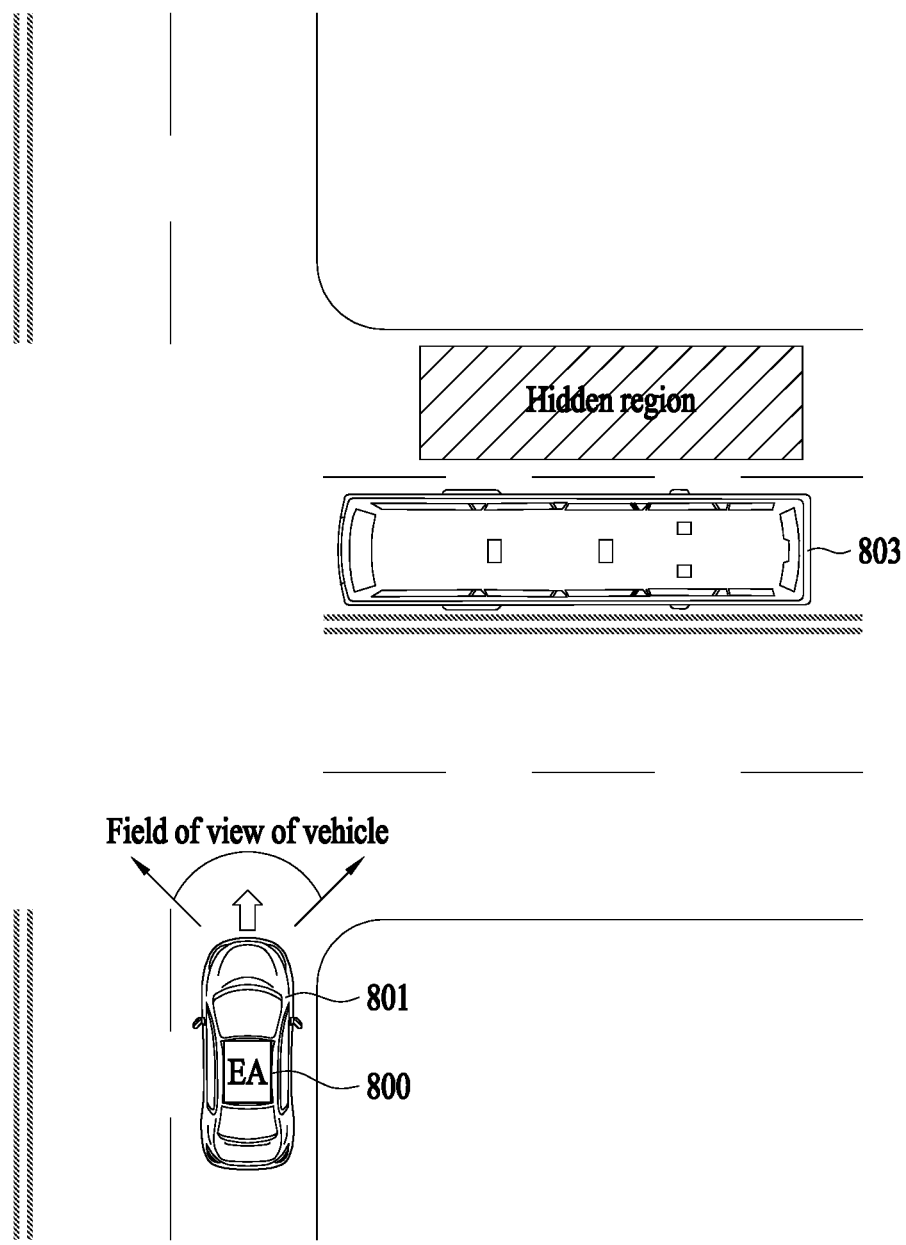
FIG. 8 illustrates an embodiment in which an electronic apparatus recognizes a hidden region.

FIG. 8 illustrates an embodiment in which an electronic apparatus recognizes a hidden region.

An electronic apparatus (indicated as "EA" in FIG. 8) 800 may be included in a vehicle 801. For example, the vehicle 801 may be an autonomous vehicle.

The electronic apparatus 800 may recognize a hidden region which is a region where another vehicle is possibly present in an area hidden from the field of view of the vehicle 801 by an external object 803. Specifically, based on ambient road information of the vehicle 801 and field of view information of the vehicle 801, the electronic apparatus 800 may recognize the external object 803, which is detected in the field of view of the vehicle 801, and the hidden region which is hidden by the external object 803 and in which any other vehicle is possibly present. For example, referring to FIG. 8, the electronic apparatus 800 may recognize, as a hidden region, a partial region in a lane next to a lane in which a bus corresponding to the external object 803 is present.

The electronic apparatus 800 may provide a passenger of the vehicle 801 with information regarding the hidden region. For example, the electronic apparatus 800 may provide a user with a notification regarding the hidden region by controlling a display of the vehicle 801 to implement an augmented reality representing the hidden region.

Figure 9:
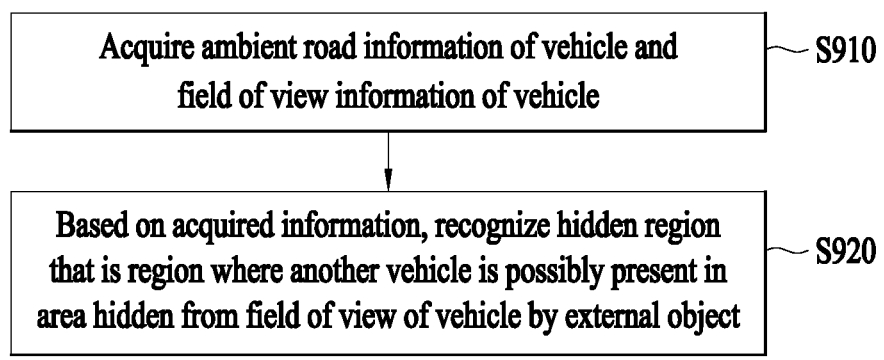
FIG. 9 illustrates an embodiment in which an electronic apparatus operates.

FIG. 9 illustrates an embodiment in which an electronic apparatus operates.

In operation S910, the electronic apparatus 800 may acquire ambient road information of a vehicle and field of view information of the vehicle.

The electronic apparatus 800 may acquire ambient road information of the vehicle from the inside or outside of the vehicle. In one example, the electronic apparatus 800 may acquire information regarding a road map of the surroundings of the vehicle from a navigator of the vehicle. In another example, the electronic apparatus 800 may acquire the information regarding the road map of the surroundings of the vehicle from a server or infrastructure. The information regarding the road map may include information regarding a lane present in the surroundings of the vehicle (e.g., a lane number or a lane vector).

For example, the information regarding the road map may include at least one of topology data, road data, HD map data, and dynamic data. The information regarding the road map may include a plurality of layers. For example, the information regarding the road map may further include a first layer matching the topology data, a second layer matching the road data, a third data matching the HD map data, and a fourth layer matching the dynamic data. The information regarding the road map may further include a static object.

The topology data may be set as a map constructed by connecting the center of a road. The topology data is suitable for displaying an approximate position of the vehicle. The topology data may be usually in the form of data used by a navigator for a driver. The topology data may be understood as data on road information from which lane information is excluded. The topology data may be generated based on data that is received from an external server through a communication device. The topology data may be based on data that is stored in at least one memory provided in the vehicle.

The road information may include at least one of road slope data, road curvature data, or road speed limit data. The road data may further include overtaking not-allowed section data. The road data may be based on data that is received from an external server. The road data may be based on data that is generated by an object detecting device.

The HD map data may include topology information for each lane on a road, connection information of each lane, and property information (e.g., a traffic sign, a lane marking/property, road furniture, and the like) for localization of the vehicle. The HD map data may be based on data that is received from an external server through a communication device. The electronic apparatus 800 may acquire information regarding an HD map from a memory provided in the vehicle or may acquire the information regarding the HD map from a server or infrastructure.

The dynamic data may include a variety of dynamic information occurring on a road. For example the dynamic data may include construction information, variable speed lane information, road surface information, traffic information, moving object information, and the like. The dynamic data may be based on data that is received from an external server through a communication device. The dynamic data may be based on data that is generated in an object detecting device.

According to an embodiment, the electronic apparatus 800 may acquire field of view information from at least one sensor provided in the vehicle. For example, the electronic apparatus 800 may acquire the field of view information of the vehicle from at least one of a camera, a radar sensor, or a lidar sensor of the vehicle. According to another embodiment, the electronic apparatus 800 may recognize a preset range of angle relative to front and side surfaces of the vehicle as a field of view of the vehicle. For example, the electronic apparatus 800 may recognize an angle of 114 degrees, which is an average viewing angle of a driver, as a field of view of the vehicle.

The electronic apparatus 800 may monitor whether an intersection or a road junction is present in a driving scheduled route, and acquire information regarding the intersection or the road junction. The electronic apparatus 800 may acquire information regarding a vehicle in the surroundings of the intersection or the road junction. For example, the electronic apparatus 800 may acquire information regarding a speed, a position, a direction, and the like of a nearby vehicle through vehicle-to-everything (V2X) communication. In addition, the electronic apparatus 800 may acquire information regarding a traffic condition in the surroundings of the intersection or the road junction. Based on information regarding nearby vehicles, the electronic apparatus 800 may identify a nearby vehicle coming close to the vehicle. In addition, as the vehicle enters the intersection or the road junction, the electronic apparatus 800 may transmit information regarding the vehicle to an outside through V2X communication.

In operation S920, the electronic apparatus 800 may recognize, based on the information acquired in operation S910, a hidden region where another vehicle is possibly present in an area hidden from the field of view of the vehicle by an external object. Specifically, the electronic apparatus 800 may recognize the external object detected in the field of view of the vehicle based on the ambient road information of the vehicle and the field of view information of the vehicle, and may recognize the hidden region which is hidden by the external object and in which any other vehicle is possibly present.

The electronic apparatus 800 may recognize a position and a size of the external object based on the ambient road information of the vehicle and the field of view information of the vehicle, and may recognize the hidden region based on the position and the size of the external object. For example, when the external object is determined to be present in a second lane based on map information regarding the entire lanes and surrounding image information acquired from a camera, the electronic apparatus 800 may recognize, based on the size of the external object, a predetermined region of a first lane hidden by the external object as a hidden region. In addition, when the external object is positioned in the first lane, the electronic apparatus 800 may recognize that a hidden region does not exist.

The ambient road information of the vehicle may include nearby lanes for a lane in which an external object is present. Specifically, the electronic apparatus 800 may recognize the lane in which the external object is present, and may acquire information regarding nearby lanes of the recognized lane. Based on the information regarding the nearby lanes, the electronic apparatus 800 may determine whether there is at least one lane hidden from the field of view of the vehicle by the external object. When at least one lane is determined to exist, the electronic apparatus may recognize a specific region in the at least one lane as a hidden region. When at least one lane is determined to not exist, the electronic apparatus 800 may recognize that a hidden region does not exist. For example, the electronic apparatus 800 may recognize, based on information regarding nearby lanes of a third lane in which a large-sized vehicle is present, that first and second lanes are present within a region hidden by the large-sized vehicle, and may recognize a specific region in the first and second lanes as a hidden region.

The electronic apparatus 800 may provide a passenger through an output part of the vehicle with at least one of: information regarding a recognized hidden region, information regarding an external vehicle present in the hidden region, information on a driving scheduled route of the vehicle, or information on a driving scheduled route of an external vehicle. Specifically, the electronic apparatus 800 may display the information regarding the hidden region and the like through a display provided in the vehicle. For example, through a head up display (HUD), the electronic apparatus 800 may implement an augmented reality that represents information regarding a hidden region or information regarding an external vehicle detected in the hidden region.

The electronic apparatus 800 may acquire information regarding the recognized hidden region from an outside, and provide the acquired information regarding the recognized hidden region to a passenger. In an embodiment, the electronic apparatus 800 may receive an image regarding the hidden region from a server or infrastructure, and provide the passenger through a display provided in the vehicle with the received image regarding the hidden region. In another example, the electronic apparatus 800 may receive an image regarding the hidden region from a nearby vehicle, may merge, based on relative positions and relative angles of the vehicle and the nearby vehicle, an image captured by a camera of the vehicle and a received image regarding the hidden region, and may provide the merged image through a display provided in the vehicle.

Thus, the electronic apparatus 800 may recognize a hidden region hidden by an external object and provide information regarding the recognized hidden region, thereby enabled to secure driving stability of the vehicle.

Figure 10:
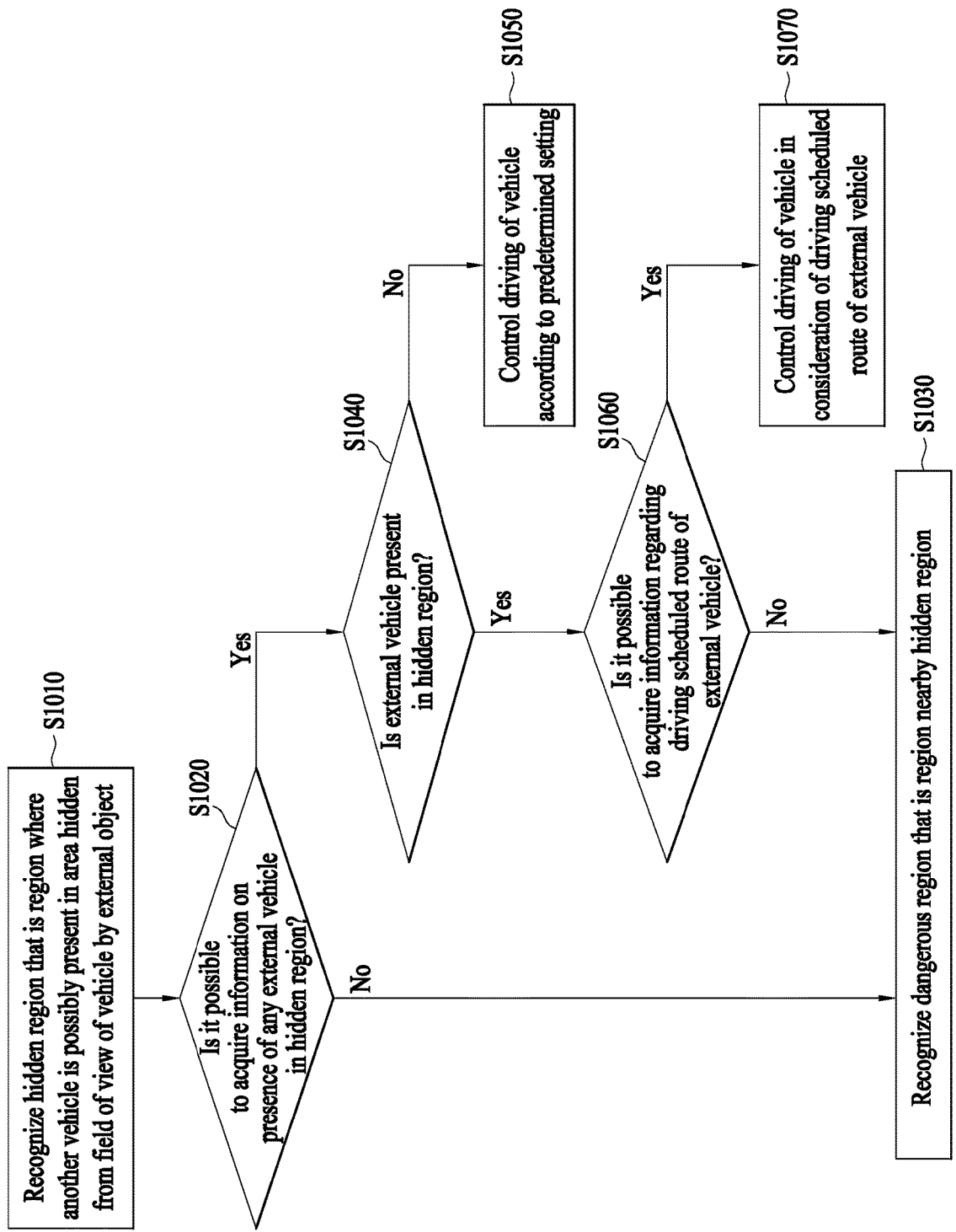
FIG. 10 illustrates another embodiment in which an electronic apparatus operates.

FIG. 10 illustrates another embodiment in which an electronic apparatus operates.

In operation S1010, the electronic apparatus 800 may recognize a hidden region that is a region where another vehicle is possibly present in an area hidden from a field of view of the vehicle by an external object.

In operation S1020, the electronic apparatus 800 may determine whether it is possible to acquire information on presence of any external vehicle present in the hidden region. According to an embodiment, the electronic apparatus 800 may acquire information on presence of any external vehicle in a hidden region through vehicle-to-network (V2N) communication with an external server or vehicle-to-infra (V2I) communication.

According to a result of the determination made in operation S1020, when it is not possible to acquire the information on presence of any external vehicle in the hidden region, the electronic apparatus 800 may recognize a region nearby the hidden region in a driving scheduled route of the vehicle as a dangerous region in operation S1030. Specifically, when it is not possible to acquire, through communication with an outside, the information on presence of any external vehicle in the hidden region, the electronic apparatus 800 may recognize a region nearby the hidden region in the driving scheduled route of the vehicle as a dangerous region.

According to a result of the determination made in operation S1020, when it is possible to acquire the information on presence of any external vehicle in the hidden region, the electronic apparatus 800 may determine whether any external vehicle is present in the hidden region in operation S1040. Specifically, the electronic apparatus 800 may acquire, through communication with an outside, the information on presence of any external vehicle in the hidden region and may determine, based on the acquired information, whether any external vehicle is present in the hidden region. In an example, as the electronic apparatus 800 recognizes a position of an external vehicle through V2V communication with an external vehicle, the electronic apparatus 800 may determine whether the external vehicle is present in the hidden region. In another example, the electronic apparatus 800 may acquire through V2I communication with infrastructure, information regarding a vehicle present in the hidden region and may determine, based on the acquired information, whether any external vehicle is present in the hidden region.

According to a result of the determination made in operation S1040, when any external vehicle is not present in the hidden region, the electronic apparatus 800 may control driving of the vehicle according to a predetermined setting in operation S1050. For example, the electronic apparatus 800 may control driving of the vehicle according to a preset driving route and a preset driving speed.

According to a result of the determination made in operation S1040, when any external vehicle is present in the hidden region, the electronic apparatus 800 may determine whether it is possible to acquire information on a driving scheduled route of a corresponding external vehicle in operation S1060. For example, the electronic apparatus 800 may determine, through V2V communication with an external vehicle, information on a driving scheduled route of the external vehicle.

According to a result of the determination in operation S1060, when it is not possible to acquire the information on the driving scheduled route of the external vehicle, the electronic apparatus 800 may control the vehicle based on the driving scheduled route in operation 51070. For example, when the driving scheduled route of the vehicle and the driving scheduled route of the external vehicle overlap, the electronic apparatus 800 may negotiate a sequence order with the external vehicle and control driving of the vehicle according to a result of the negotiation.

According to a result of the determination made in operation S1060, when it is not possible to acquire the information on the driving scheduled route of the external vehicle, the electronic apparatus 800 may recognize a region nearby the hidden region in the driving scheduled route of the vehicle as a dangerous region in operation S1030.

The electronic apparatus 800 may provide a passenger through an output part provided in the vehicle with information regarding the recognized dangerous region. Accordingly, the electronic apparatus 800 may recognize presence or absence of any external vehicle in a hidden region or the electronic apparatus 800 may recognize a dangerous region because a driving scheduled route of an external vehicle is not identified, and therefore driving stability of the vehicle may be secured.

Figure 11:
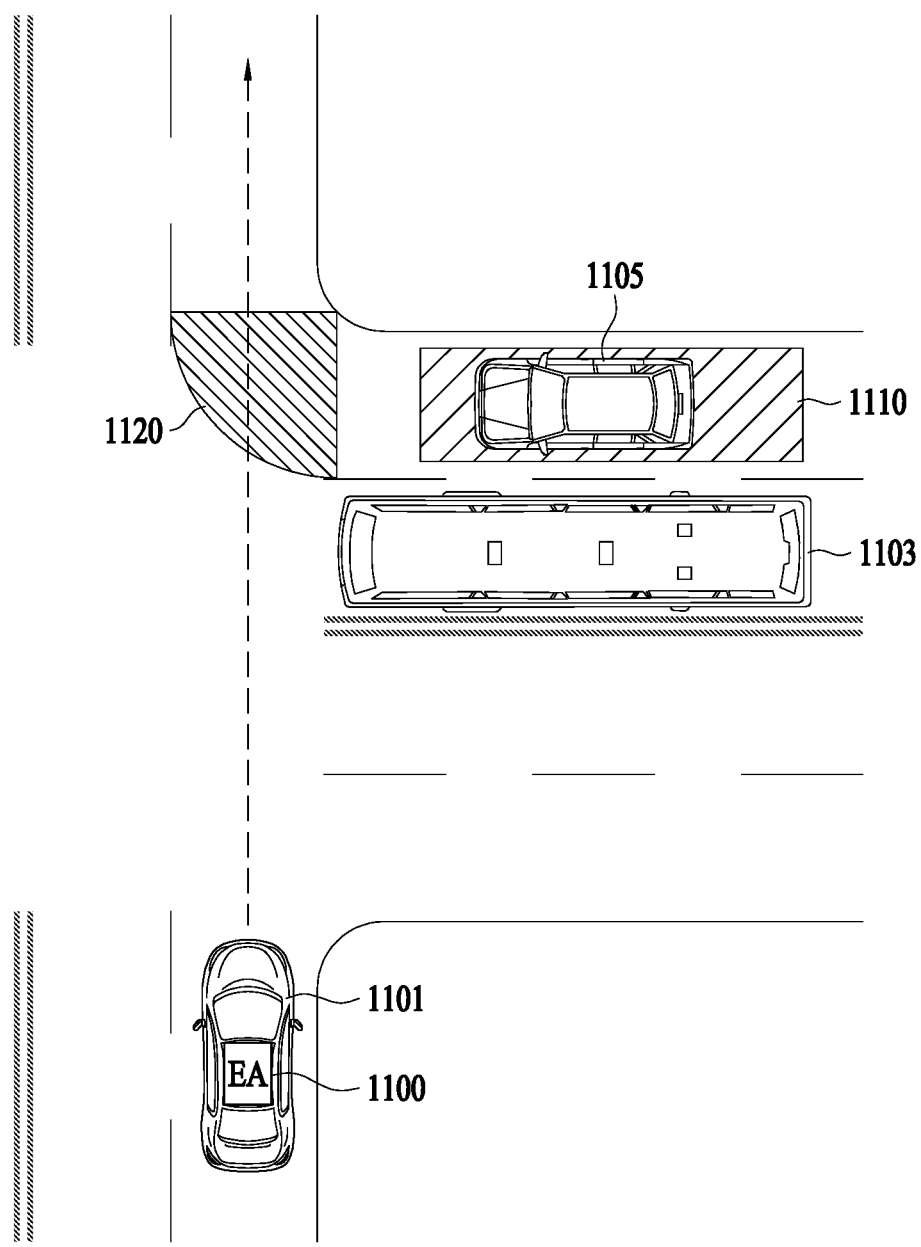
FIG. 11 illustrates an embodiment in which an electronic apparatus recognizes a dangerous region.

FIG. 11 illustrates an embodiment in which an electronic apparatus recognizes a dangerous region.

When a vehicle 1101 arrives at an intersection shown in FIG. 11, an electronic apparatus (indicated as "EA" in FIG. 11) 1100 included in the vehicle 1101 may recognize a hidden region 1110 that is a region where another vehicle is possibly present in an area hidden from a field of view of the vehicle 1101 by an external object 1103.

The electronic apparatus 1100 may acquire information on presence of any other vehicle in the hidden region 1110, and may determine, based on the acquired information, that an external vehicle 1105 is present in the hidden region 1110.

Then, the electronic apparatus 1100 may determine whether it is possible to acquire information on a driving scheduled route of the external vehicle 1105. According to an embodiment, when V2V communication with the external vehicle 1105 is not available, the electronic apparatus 110 may determine that it is not possible to acquire the information on the driving scheduled route of the external vehicle 1105. For example, referring to FIG. 11, the electronic apparatus 1100 may acquire information regarding whether the external vehicle 1105 is about to enter a first lane or a second lane by making a right turn. Accordingly, the electronic apparatus 1100 is not allowed to predict the driving scheduled route of the external vehicle 1105, thereby enabled to recognize a dangerous region 1120 nearby the hidden region 1110 in a straight driving route which is a driving scheduled route of the vehicle 1101.

According to another embodiment, since communication with an outside is not available, the electronic apparatus 1100 may not be allowed to identify presence of any other vehicle in the hidden region 1110. Thus, the electronic apparatus 1100 may recognize the dangerous region 1120 that is nearby the hidden region 1110 in the driving scheduled route of the vehicle 1101.

Figure 12:
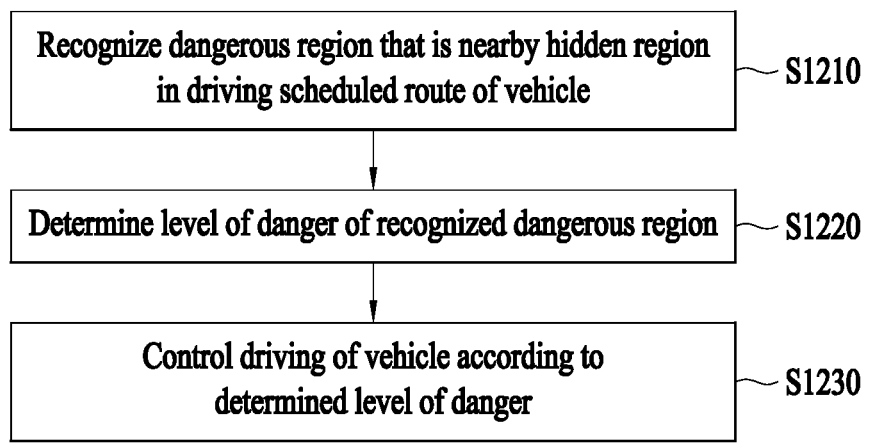
FIG. 12 illustrates an embodiment in which an electronic apparatus determines a level of danger of a dangerous region.

FIG. 12 illustrates an embodiment in which an electronic apparatus determines a level of danger of a dangerous region.

In operation S1210, the electronic apparatus 800 may recognize a dangerous region that is nearby a hidden region in a driving scheduled route of the vehicle. In one example, when it is not possible to acquire information on presence of any external vehicle in the hidden region, the electronic apparatus 800 may recognize a dangerous region that is nearby the hidden region in a driving scheduled route of the vehicle. In another example, when an external vehicle is present in a hidden region and it is not possible to acquire information on a driving scheduled route of the external vehicle, the electronic apparatus 800 may recognize a dangerous region that is nearby the hidden region in a driving scheduled route of the vehicle.

In operation S1220, the electronic apparatus 800 may determine a level of danger of the dangerous region recognized in operation S1210.

According to an embodiment, the electronic apparatus 800 may determine the level of danger of the dangerous area according to the number of lanes present in the hidden region. For example, when only one lane is present in the hidden region, the electronic apparatus 800 may determine the level of danger of the dangerous region as "low", and, when two lanes are present in the hidden region, the electronic apparatus 800 may determine the level of danger of the dangerous region as "high."

According to another embodiment, the electronic apparats 800 may determine a level of danger of a dangerous region according to the number of vehicles coming in and out of a hidden region. For example, when it is determined that no vehicle coming in and out the hidden region is found, the electronic apparatus 800 may determine the level of danger of the dangerous region as "low", and, when one or more vehicles coming in and out the hidden region are found, the electronic apparatus 800 may determine the level of danger of the dangerous region According to yet another embodiment, the electronic apparatus 800 may determine a level of danger of a dangerous area according to a percentage of vehicles supporting V2V communication among nearby vehicles. For example, when the vehicles supporting V2V communication account for 50% or more of the nearby vehicles, the electronic apparatus 800 may determine the level of danger of the dangerous region as "low", and, when the vehicles supporting V2V communication account for less than 50% of the nearby vehicles, the electronic apparatus 800 may determine the level of danger of the dangerous region as "high."

In operation S1230, the electronic apparatus 800 may control the vehicle according to the level of danger of the danger region determined in operation S1220.

In one example, when the level of danger of the dangerous region is "low", the electronic apparatus 800 may control the vehicle to drive at a speed lower than a preset speed to the dangerous region. In another example, when the level of danger of the dangerous region is "low", the electronic apparatus 800 may control driving of the vehicle by setting a first standby position and a second standby position. A specific embodiment thereof will be described with reference to FIG. 13.

In an example, when the level of danger of the dangerous region is "high", the electronic apparatus 800 may control the vehicle so that the vehicle drives while avoiding the dangerous region. In another example, when the level of danger of the dangerous region is "high", the electronic apparatus 800 may control the vehicle so that the vehicle switches from an autonomous driving mode to a manual driving mode. In another example, when the level of danger of the dangerous region is "high", the electronic apparatus 800 may determine whether a gaze of the drive is directed forward, and, when the gaze of the driver is not directed forward, the electronic apparatus 800 may control a seat of the driver to return back to its original position or may provide the driver with a sound notification through an output part.

Accordingly, the electronic apparatus 800 may control driving of the vehicle according to a recognition rate of a dangerous region, thereby enabled to control the vehicle to drive more safely.

Figure 13:
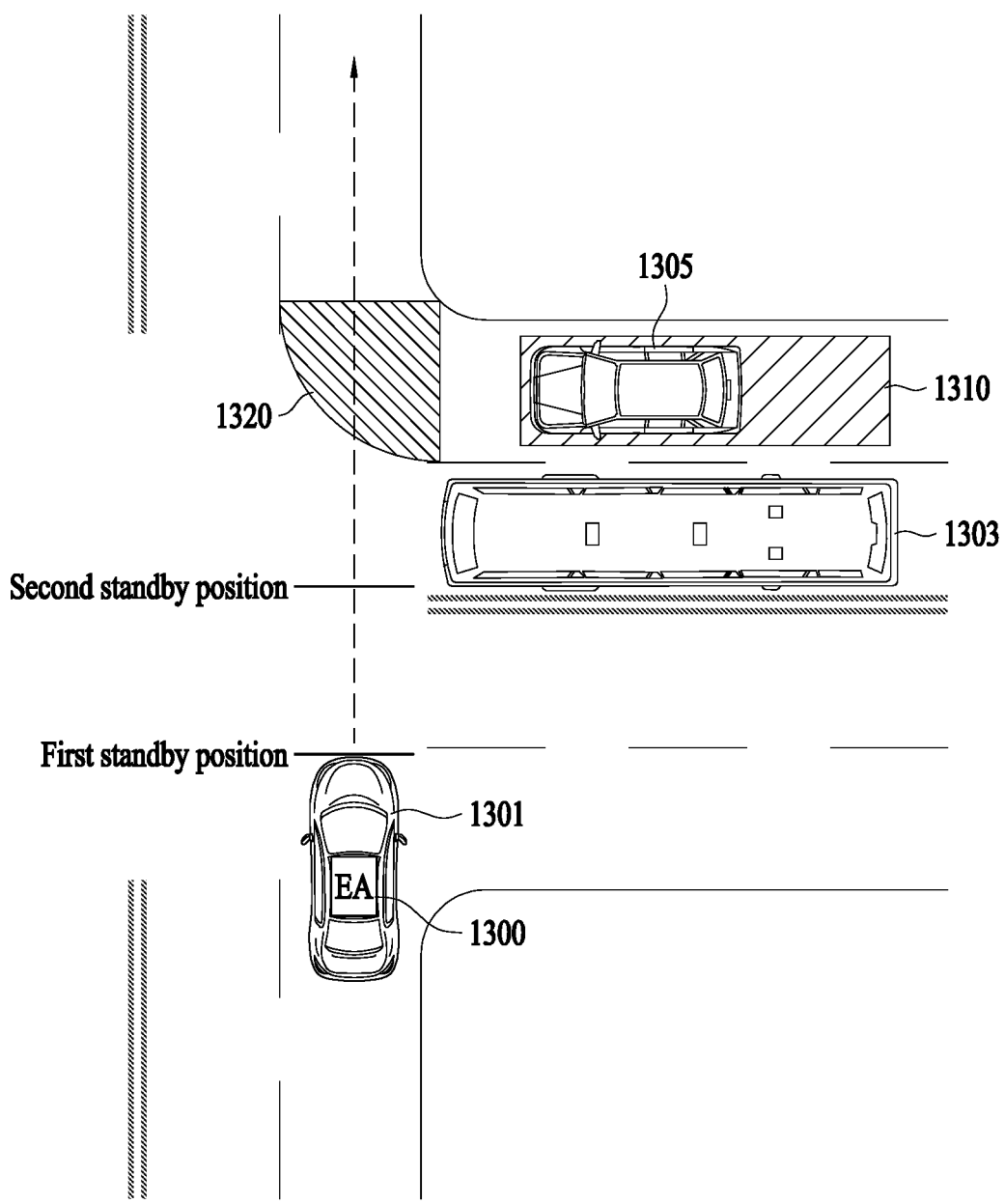
FIG. 13 illustrates an embodiment in which an electronic apparatus controls a vehicle according to a level of danger of a dangerous region.

FIG. 13 illustrates an embodiment in which an electronic apparatus controls a vehicle according to a level of danger of a dangerous region.

When a vehicle 1301 arrives at an intersection shown in FIG. 13, an electronic apparatus (indicated as "EA" in FIG. 13) 1300 included in the vehicle 1301 may recognize a hidden region 1310 that is a region where another vehicle is possibly present in an area hidden from a field of view of the vehicle 1301 by an external object 1303.

The electronic apparatus 1300 may acquire information on presence of any other vehicle in the hidden region 1310, and may determine, based on the acquired information, that an external vehicle 1305 is present in the hidden region 1310.

Then, the electronic apparatus 1300 may determine whether it is possible to acquire information on a driving scheduled route of the external vehicle 1305. According to a result of the determination, the electronic apparatus 1300 may determine that it is not possible to acquire information on a driving scheduled route of the external vehicle 1305. Accordingly, the electronic apparatus 1300 may recognize a dangerous region 1320 that is nearby the hidden region 1310 in a straight driving route, which is a driving scheduled route.

The electronic apparatus 1300 may determine a level of danger of the dangerous region 1320. For example, since only one lane exist in the hidden region 1310, the electronic apparatus 1300 may determine the level of danger of the dangerous region as "low."

The electronic apparatus 1300 may control the vehicle 1301 according to the level of danger of the dangerous region 1320. For example, the electronic apparatus 1300 may control driving of the vehicle 1301 by setting a first standby position and a second standby position. Specifically, in the case where the vehicle 1301 proceeds along a driving scheduled route, the electronic apparatus 1300 may set, as the first standby position, a position from which the external vehicle 1305 enters into the field of view of the vehicle 1300, and the electronic apparatus 1300 may set, as the second standby position, a position from which the vehicle 1301 enters into the field of view of the external vehicle 1305. The electronic apparatus 1300 may acquire GPS information of the external vehicle 1305 or front camera information and determine, based on the acquired information, a field of view of the external vehicle 1305. The electronic apparatus 1300 may control the vehicle 1301 to set the first standby position and the second standby position, such that the vehicle 1301 can pass the first standby position and the second standby position in phases. For example, the electronic apparatus 1300 may control the vehicle 1301 such that the vehicle 1301 drives at a low speed to the first position and, in response to absence of any potential of danger while driving to the first standby position, keeps driving to the second standby position.

Figure 14:
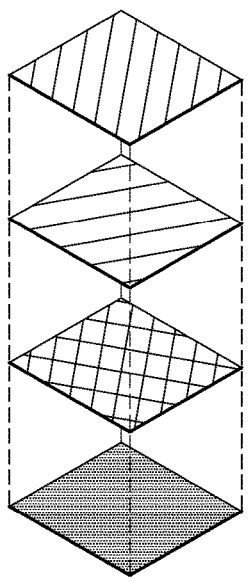
FIG. 14 illustrates an embodiment in which an electronic apparatus implements an augmented reality through a display provided in a vehicle.

FIG. 14 illustrates an embodiment in which an electronic apparatus implements an augmented reality through a display provided in a vehicle.

The electronic apparatus 800 may display, through a display provided in the vehicle, the electronic apparatus 800 may display, through a display provided in a vehicle, at least one of: an element regarding the vehicle, an element regarding an external vehicle, an element regarding negotiation about driving with the external vehicle, or an element regarding a dangerous region. Specifically, the electronic apparatus 800 may display the element regarding the vehicle and the like through a display provided in the vehicle to implement an augmented reality. For example, the electronic apparatus 800 may display the element regarding the vehicle and the like through a HUD.

The electronic apparatus 800 may display an element regarding the vehicle, an element regarding the external vehicle, an element regarding negotiation about driving with the external vehicle, and an element regarding the dangerous region in different layers. For example, as illustrated in FIG. 14, the electronic apparatus 800 may display the element regarding the vehicle, such as a driving route, a stop line, and a detected hidden region, on Layer A; the element regarding the external vehicle such as a position or a speed of the external vehicle on Layer B; an element regarding negotiation about driving such as a driving sequence on Layer C; and an element regarding the dangerous region on Layer D.

Figure 15:
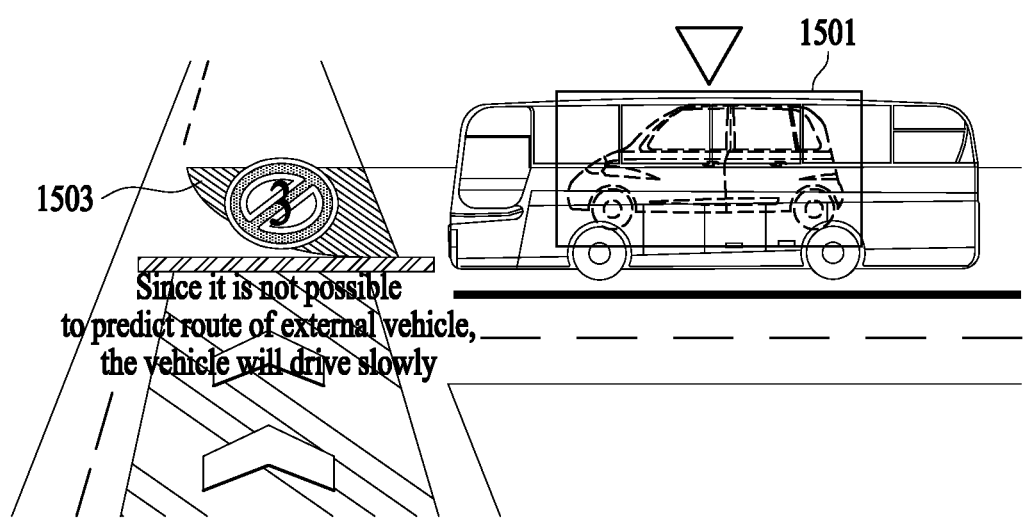
FIG. 15 illustrates an embodiment in which an electronic apparatus implements an augmented reality through a front window of a vehicle.

FIG. 15 illustrates an embodiment in which an electronic apparatus implements an augmented reality through a front window of a vehicle.

When a vehicle enters an intersection, the electronic apparatus 800 in the vehicle may recognize a hidden region and detect an external vehicle in the hidden region through V2V communication. The electronic apparatus 800 may determine whether it is possible to acquire information on a driving scheduled route of an external vehicle. According to a result of the determination, when it is not possible to acquire information on a driving scheduled route of the external vehicle, the electronic apparatus 800 may recognize a region nearby the hidden region in the driving scheduled route of the vehicle as a dangerous region.

As illustrated in FIG. 15, the electronic apparatus 800 may display information 1501 regarding an external vehicle and information 1503 regarding a dangerous region on a front window of the vehicle. In other words, the electronic apparatus 800 may implement an augmented reality through a display provided in the vehicle. For example, the electronic apparatus 800 may indicate a speed of the external vehicle by using color of the information 1501 regarding the external vehicle. In addition, as illustrated in FIG. 15, the electronic apparatus 800 may display information on a driving scheduled route of the vehicle on the front window of the vehicle. Specifically, the electronic apparatus 800 may display, on the front window, information indicating that the vehicle is going to drive slowly due to an unpredictable driving route of the external vehicle and going to stop at the stop line for three seconds. The electronic apparatus 800 may display the information 1501 regarding the external vehicle, the information 1503 regarding the dangerous region, and the information on a driving scheduled route of the vehicle in different layers on the front window.

Figure 16:
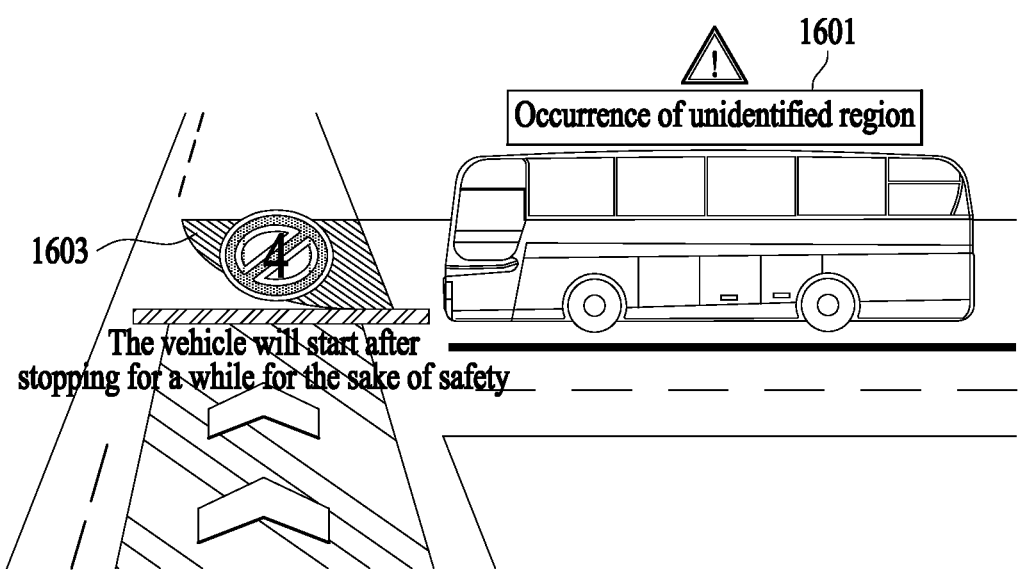
FIG. 16 illustrates another embodiment in which an electronic apparatus implements an augmented reality through a front window of a vehicle.

FIG. 16 illustrates another embodiment in which an electronic apparatus implements an augmented reality through a front window of a vehicle.

As a vehicle enters an intersection, the electronic apparatus 800 included in the vehicle may recognize a hidden region but may not acquire information regarding whether any external vehicle is present in the hidden region. Accordingly, the electronic apparatus 800 may recognize a region nearby the hidden region in a driving scheduled route of the vehicle as a dangerous region.

As illustrated in FIG. 16, the electronic apparatus 800 may display, on a front window of the vehicle, information 1601, indicating that it is not allowed to identify an external vehicle present in a hidden region, and information 1603 regarding a dangerous region. In addition, as illustrated in FIG. 16, the electronic apparatus 800 may display, on the front window of the vehicle, information on a driving scheduled route of the vehicle. Specifically, the electronic apparatus 800 may display, on the front window of the vehicle, information indicating that it is going to stop for four seconds for the sake of safety. The electronic apparatus 800 may display all the types of information, illustrated in FIG. 16, in different layers on the front window.

Figure 17A:
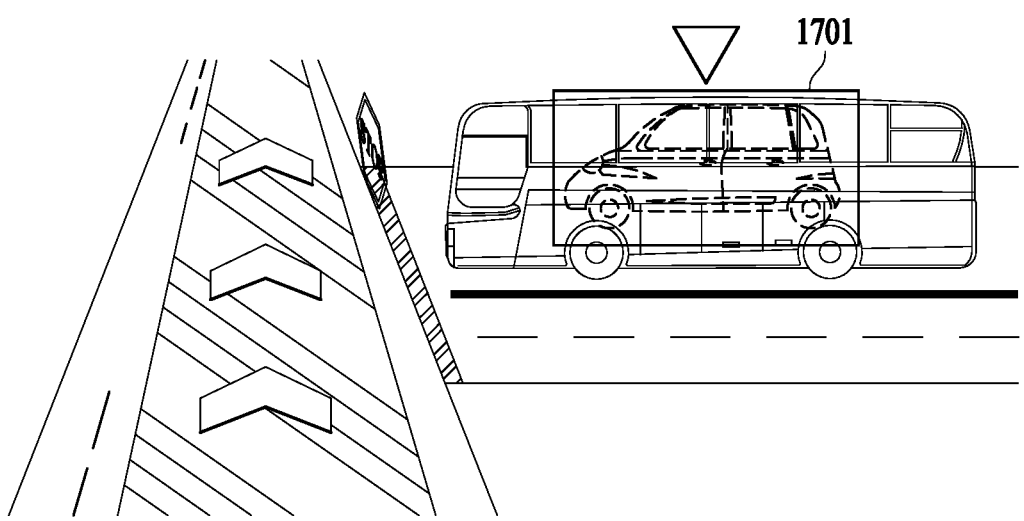
FIGS. 17A and 17B illustrate another embodiment in which an electronic apparatus implements an augmented reality through a front window of a vehicle.
Figure 17B:
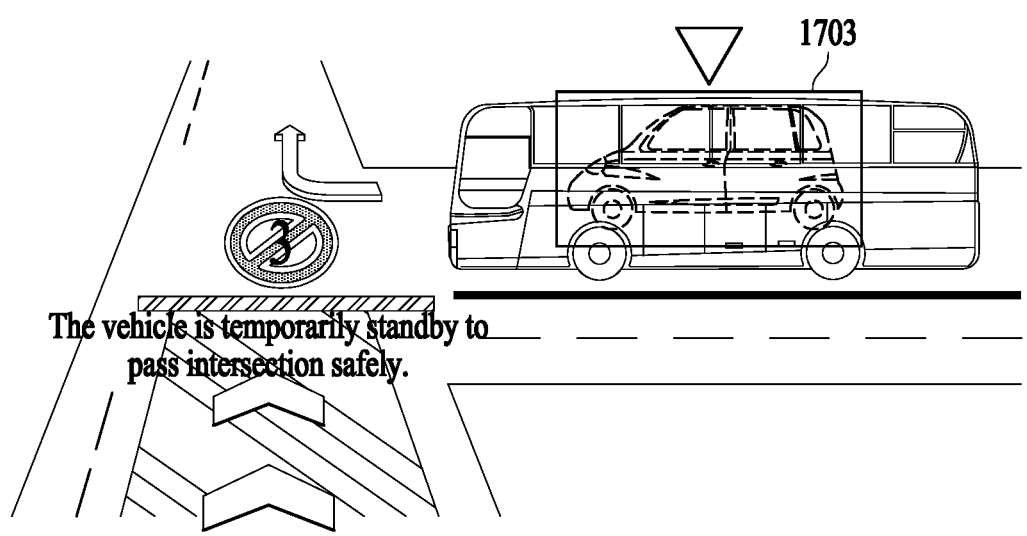

FIGS. 17A and 17B illustrate another embodiment in which an electronic apparatus implements an augmented reality through a front window of a vehicle.

As a vehicle enters an intersection, the electronic apparatus 800 included in the vehicle may recognize a hidden region and detect an external vehicle in the hidden region through V2V communication. The electronic apparatus 800 may acquire information on a driving scheduled route of the external vehicle. When a driving scheduled route of the vehicle overlap the driving scheduled route of the external vehicle, the electronic apparatus 800 may share driving sequence-related information with the external vehicle to determine a driving sequence of the vehicle and the external vehicle.

FIG. 17A illustrates an exemplary case where a vehicle is determined to drive in a driving scheduled route earlier than an external vehicle. As illustrated in FIG. 17A, the electronic apparatus 800 may display, on a front window of the vehicle, information 1701 regarding an external vehicle present in a hidden region. In addition, as illustrated in FIG. 17A, the electronic apparatus 800 may display, on the front window of the vehicle, information regarding a stop line in front of the external vehicle and may display, on the front window of the vehicle, information on a driving scheduled route of the vehicle.

FIG. 17B illustrates an exemplary case where an external vehicle is determined to drive in a driving scheduled route earlier than the vehicle. As illustrated in FIG. 17B, the electronic apparatus 800 may display, on the front window of the vehicle, information 1703 regarding an external vehicle present in a hidden region. In addition, as illustrated in FIG. 17B, the electronic apparatus 800 may display, on the front window of the vehicle, information on a driving scheduled route of the external vehicle and may display, on the front window of the vehicle, information indicating that the vehicle is waiting for three seconds.

Figure 18A:
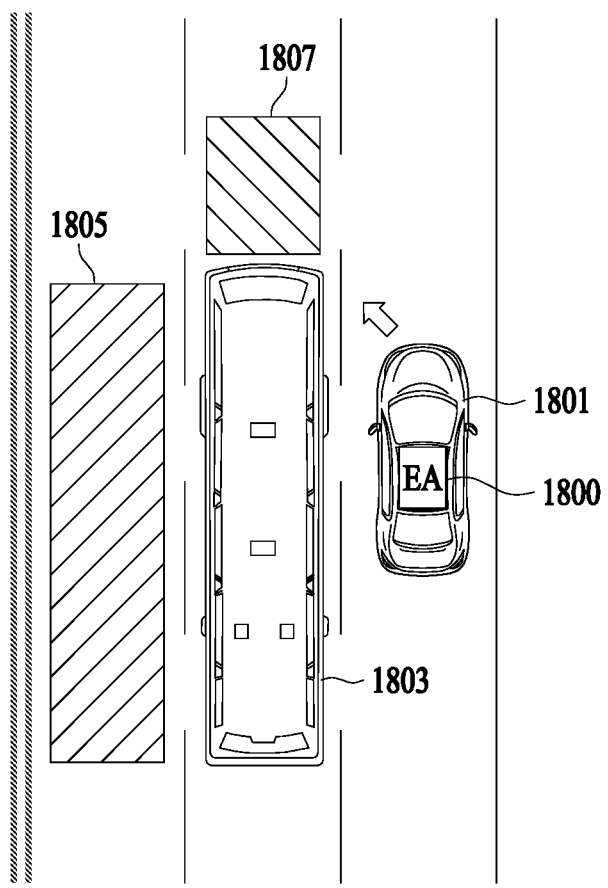
FIGS. 18A and 18B illustrate an embodiment in which an electronic apparatus operates upon recognizing a hidden region and a dangerous region.
Figure 18B:
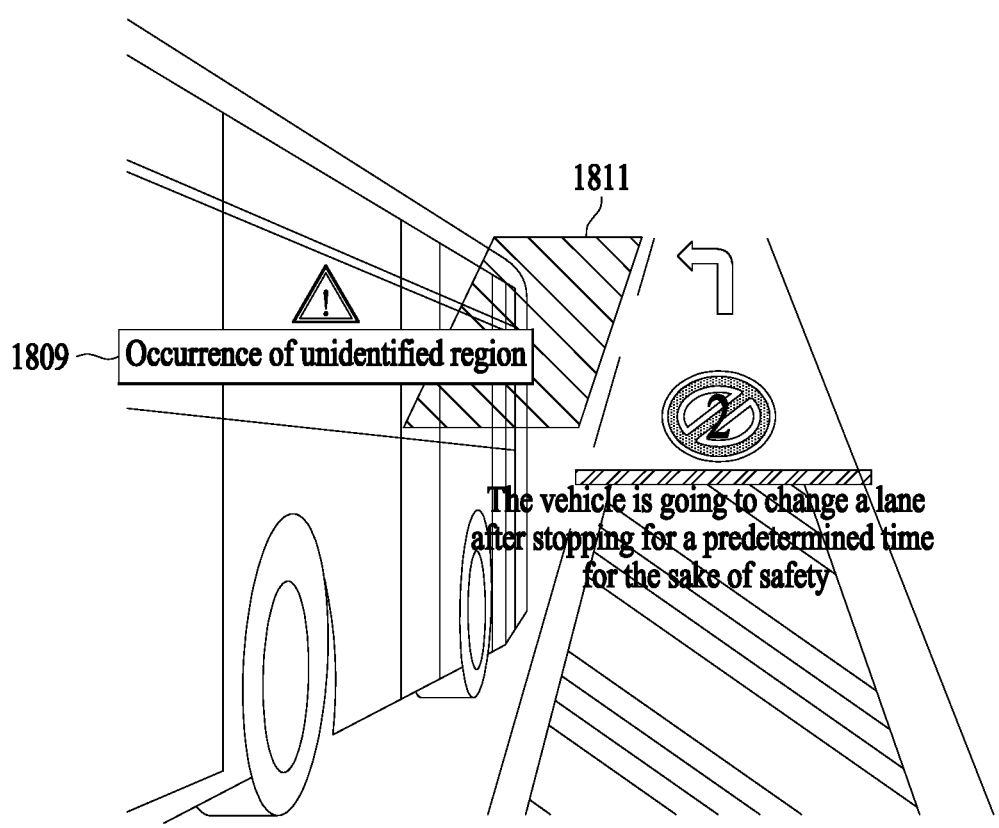

FIGS. 18A and 18B illustrate an embodiment in which an electronic apparatus operates upon recognizing a hidden region and a dangerous region.

Referring to FIG. 18A, when a vehicle 1801 is scheduled to make a lane change, an electronic apparatus (indicated as "EA" in FIG. 18A) 1800 included in the vehicle 1801 may recognize a hidden region 1805 that is a region where another vehicle is possibly present in an area hidden from a field of view of the vehicle 1801 by an external object 1803.

The electronic apparatus 1800 may not allowed to determine whether any other vehicle is present in the hidden region 1805 and accordingly the electronic apparatus 1800 may recognize a region nearby the hidden region 1805 in a driving scheduled route of the vehicle 1801 as a dangerous region 1807.

Referring to FIG. 18B, the electronic apparatus 1800 may implement an augmented reality through a front window of the vehicle 1801. As illustrated in FIG. 18B, the electronic apparatus 1800 may display, on a front window of the vehicle 1801, information 1809, which indicates that confirming presence of any external vehicle in the hidden region is now allowed, and information 1811 regarding the dangerous region. In addition, as illustrated in FIG. 18B, the electronic apparatus 1800 may display, on the front window of the vehicle 1801, information which indicating that a lane change will be performed after predetermined time for safety.

Figure 19:
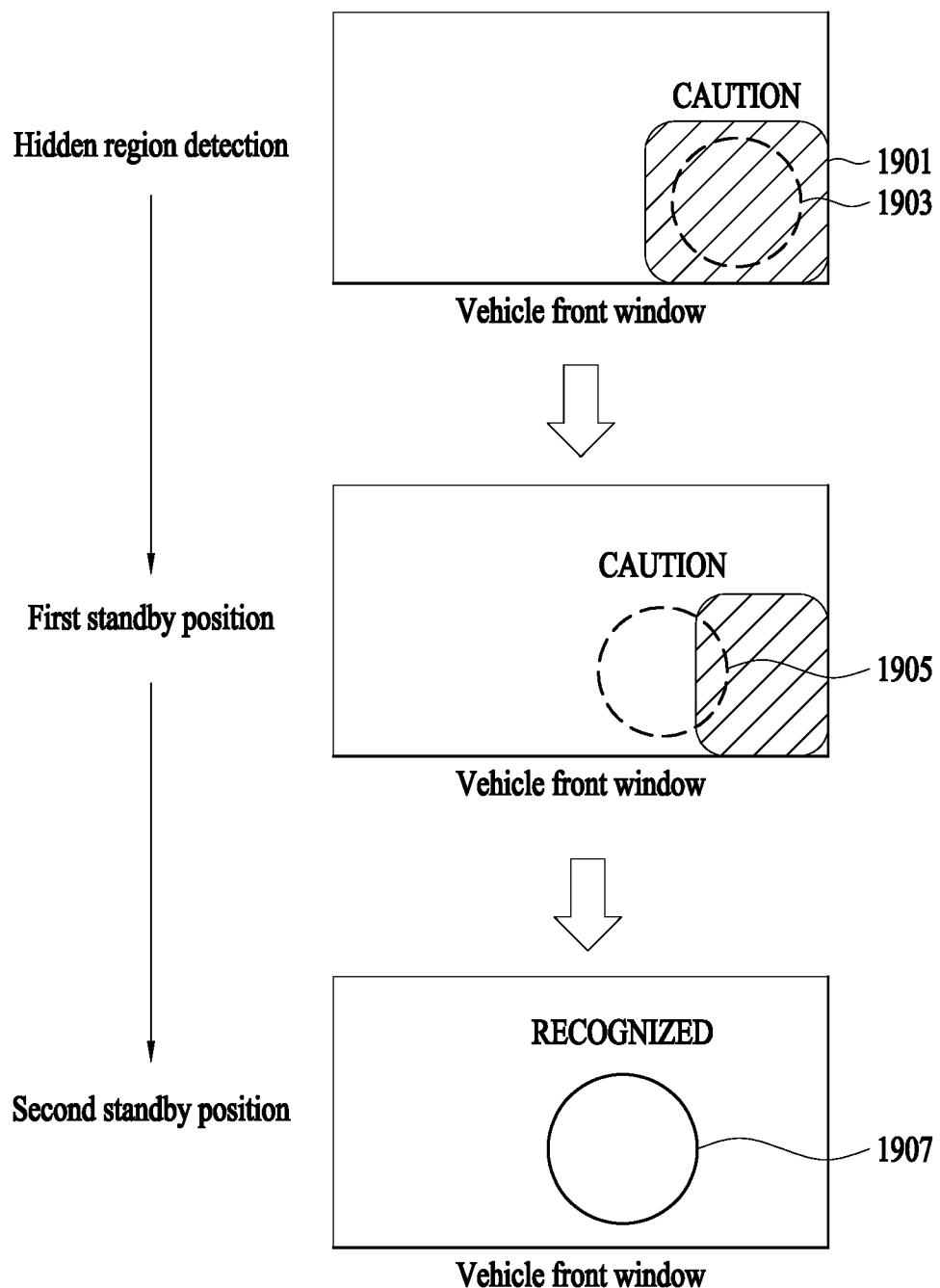
FIG. 19 illustrates an embodiment in which an electronic apparatus operates upon recognizing an external vehicle present in a hidden region.

FIG. 19 illustrates an embodiment in which an electronic apparatus operates upon recognizing an external vehicle present in a hidden region.

First, the electronic apparatus 800 may display, on the front window of the vehicle, information 1901 regarding a hidden region where another vehicle is possibly present in an area hidden from a field of view of the vehicle by an external object a, and information 1903 regarding an external vehicle present in the hidden region.

Then, as the vehicle or the external vehicle moves forward, the electronic apparatus 800 may recognize a first standby position from which the external vehicle enters into the field of view of the vehicle. At the first standby position, the electronic apparatus 800 may display the information 1905 regarding the external vehicle on the front window of the vehicle, Then, as the vehicle or the external vehicle moves forward, the electronic apparatus 800 may recognize a second standby position from which the vehicle enters into the field of view of the external vehicle. At the second standby position, the electronic apparatus 800 may display the information 1907 regarding the external vehicle on the front window of the vehicle.

Figure 20:
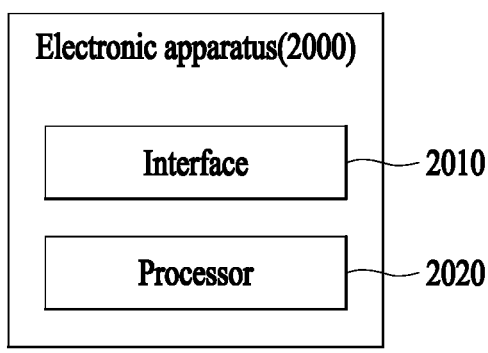
FIG. 20 is a block diagram of an electronic apparatus.

FIG. 20 is a block diagram of an electronic apparatus.

According to an embodiment, an electronic apparatus 2000 may include an interface 2010 and a processor 2020. FIG. 20 show only elements of the electronic apparatus 2000 related to the present embodiment. Therefore, those of ordinary skill in the technical field related to the present embodiment will appreciate that general-use elements other than the elements shown in FIG. 20 may be further included.

The interface 2010 may acquire ambient road information of a vehicle from an inside or an outside of the vehicle. The interface 2010 may acquire field of view information of the vehicle from at least one sensor provided in the vehicle. The interface 2010 may acquire information regarding an intersection or a road junction.

The processor 2020 may control overall operations of the electronic apparatus 2000 and process data and signals. The processor 2020 may be configured as at least one hardware unit. In addition, the processor 2020 may operate by one or more software modules generated by executing program codes stored in a memory.

Based on sensing information acquired by the interface 2010, the processor 2020 may recognize a hidden region where another vehicle is possibly present in an area hidden from a field of view of the vehicle by an external object.

The processor 2020 may determine whether it is possible to acquire information on presence of any external vehicle in the hidden region. According to a result of the determination, when it is not possible to acquire the information on presence of any external vehicle in the hidden region, the processor 2020 may recognize a region nearby the hidden region in a driving scheduled route of the vehicle as a dangerous region.

When it is possible to acquire the information on presence of any external vehicle in the hidden region, the processor 2020 may determine whether any external vehicle is present in the hidden region. According to a result of the determination, when any external vehicle is not present in the hidden region, the processor may control driving of the vehicle according to a predetermined setting. According to a result of the determination, when any external vehicle is present in the hidden region, the processor 2020 may determine whether it is possible to acquire information on a driving scheduled route of a corresponding external vehicle. According to a result of the determination, when it is possible to acquire the information on the driving scheduled route of the external vehicle, the processor 2020 may control the vehicle in consideration of the driving scheduled route of the external vehicle. According to a result of the determination, when it is not possible to acquire the information on the driving scheduled route, the processor 2020 may recognize a region nearby the hidden region in the driving scheduled route of the vehicle as a dangerous region.

The processor 2020 may recognize the dangerous region that is a region nearby the hidden region in the driving scheduled route of the vehicle. The processor 2020 may determine a level of danger of the recognized dangerous region. The processor 2020 may control the vehicle according to the determined level of danger of the dangerous region. For example, when the level of danger of the dangerous region corresponds to "low", the processor 2020 may control driving of the vehicle by setting a first standby position and a second standby position.

The processor 2020 may provide a passenger through an output part provided in the vehicle with at least one of: information regarding the recognized hidden region, information regarding an external vehicle present in the hidden region, information on a driving scheduled route of the vehicle, or information on a driving scheduled route of the external vehicle. The processor 2020 may provide information regarding the recognized dangerous region to the passenger through the output part provided in the vehicle. For example, the processor 2020 may implement an augmented reality by displaying the information regarding the hidden region through a HUD.

According to the present disclosure, it is possible for an electronic apparatus to recognize a hidden region hidden by an external object and to provide information regarding the recognized hidden region, thereby improving driving stability of a vehicle. It is possible for the electronic apparatus to recognize presence or absence of an external vehicle in the hidden region or a dangerous region due to an unidentified driving scheduled route of the external vehicle, thereby improving driving stability of the vehicle. In addition, it is possible for the electronic apparatus to control driving of the vehicle according to a recognition rate of the dangerous region, thereby controlling the vehicle to drive more safely.

Effects of the present disclosure are not limited to the aforementioned effects and any other technical effects not mentioned herein may be easily understood by a person skilled in the art from the claims.

The devices in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

What is claimed is:

1. An operation method of an electronic apparatus, the method comprising:
    acquiring ambient road information of a vehicle and field of view information of the vehicle;
    based on the acquired information, recognizing, as a hidden region, a region where another vehicle is possibly present in an area hidden from a field of view of the vehicle by an external object;
    determining whether it is possible to acquire information on presence of any external vehicle in the hidden region; and
    based on a result of the determination, recognizing a dangerous region that is nearby the hidden region in a scheduled driving route of the vehicle,
    wherein determining whether it is possible to acquire information on presence of any external vehicle in the hidden region comprises:
        determining whether any external vehicle is present in the hidden region, and
        based on determining that an external vehicle is present in the hidden region, determining whether it is possible to acquire information on a scheduled driving route of the external vehicle, and
    wherein recognizing the dangerous region comprises:
        based on determining that it is not possible to acquire the information on the scheduled driving route of the external vehicle, recognizing a region nearby the hidden region in the scheduled driving route of the vehicle as the dangerous region.

2. The operation method of claim 1, wherein the recognizing comprises:
recognizing a position and a size of the external object based on the acquired information; and
recognizing the hidden region based on the recognized position and the recognized size of the external object.

3. The operation method of claim 1, wherein:
the ambient road information comprises information regarding a nearby lane in which the external object is present, and
the recognizing comprises determining, based on the information regarding the nearby lane, whether at least one lane is present in the area hidden from the field of view of the vehicle by the external object.

4. The operation method of claim 1, further comprising providing information regarding the dangerous region.

5. The operation method of claim 1, wherein the recognizing of the dangerous region comprises, when it is possible to acquire the information on presence of any external vehicle in the hidden region, recognizing the dangerous region that is nearby the hidden region in the scheduled driving route of the vehicle.

6. The operation method of claim 1, further comprising:
determining a level of danger of the dangerous region; and
controlling the vehicle according to the level of danger.

7. The operation method of claim 6, wherein the controlling of the vehicle comprises controlling driving of the vehicle by setting a first standby position and a second standby position in the scheduled driving route of the vehicle.

8. The operation method of claim 7, wherein the first standby position is a position from which an external vehicle enters from the hidden region into the field of view of the vehicle, and the second standby position is a position from which the vehicle enters into a field of view of the external vehicle.

9. The operation method of claim 1, displaying, on a display provided in the vehicle, at least one of: information regarding the hidden region, information regarding an external vehicle present in the hidden region, information on the scheduled driving route of the vehicle, and information on the scheduled driving route of the external vehicle.

10. The operation method of claim 9, wherein the display is a Head Up Display (HUD) to provide an augmented reality.

11. A computer-readable non-volatile recording medium for storing a program to implement the method according to claim 1 in a computer.

12. An electronic apparatus, comprising:
an interface configured to acquire ambient road information of a vehicle and field of view information of the vehicle; and
a processor configured to, based on the acquired information, recognize, as a hidden region, a region where another vehicle is possibly present in an area hidden from a field of view of the vehicle by an external object,
wherein the processor is further configured to:
determine whether it is possible to acquire information on presence of any external vehicle in the hidden region,
based on a result of the determination, recognize a dangerous region that is a region nearby the hidden region in a scheduled driving route of the vehicle,
determine whether any external vehicle is present in the hidden region,
based on determining that an external vehicle is present in the hidden region, determine whether it is possible to acquire information on a scheduled driving route of the external vehicle, and
based on determining that it is not possible to acquire the information on the scheduled driving route of the external vehicle, recognize a region nearby the hidden region in the scheduled driving route of the vehicle as the dangerous region.

13. The electronic apparatus of claim 12, wherein the processor is further configured to: when it is possible to acquire the information on presence of any external vehicle in the hidden region, recognize the dangerous region that is a region nearby the hidden region in the scheduled driving route of the vehicle.

14. The electronic apparatus of claim 12, wherein the processor is further configured to:
determine a level of danger of the dangerous region; and
control the vehicle according to the level of danger.

15. The electronic apparatus of claim 14, wherein the processor is further configured to control driving of the vehicle by setting a first standby position and a second standby position in the scheduled driving route of the vehicle.

16. A vehicle, comprising:
a sensor configured to sense field of view information of the vehicle; and
an electronic apparatus configured to acquire ambient road information of the vehicle and field of view information of the vehicle and, based on the acquired information, recognize, as a hidden region, a region where another vehicle is possibly present in an area hidden from a field of view of the vehicle by an external object,
wherein the electronic apparatus is further configured to:
determine whether it is possible to acquire information on presence of any external vehicle in the hidden region,
based on a result of the determination, recognize a dangerous region that is a region nearby the hidden region in a scheduled driving route of the vehicle,
determine whether any external vehicle is present in the hidden region,
based on determining that an external vehicle is present in the hidden region, determine whether it is possible to acquire information on a scheduled driving route of the external vehicle, and
based on determining that it is not possible to acquire the information on the scheduled driving route of the corresponding external vehicle, recognize a region nearby the hidden region in the scheduled driving route of the vehicle as the dangerous region.

17. The operation method of claim 1, wherein acquiring the ambient road information and the field of view information comprises:
receiving the ambient road information and the field of view information from a sensor located at the vehicle or a server located outside of the vehicle; and
transmitting the ambient road information and the field of view information to a processor of the vehicle.

18. The electronic apparatus of claim 12, wherein the interface is configured to:
receive the ambient road information and the field of view information from a sensor located at the vehicle or a server located outside of the vehicle; and transmit the ambient road information and the field of view information to the processor.

19. The vehicle of claim 16, wherein the sensor is located at the vehicle and configured to transmit the field of view information, and
wherein the vehicle further comprises a processor that is configured to receive the field of view information from the sensor or a server outside of the vehicle.

* * * * *